(12) United States Patent
Takahashi et al.

(10) Patent No.: US 10,737,391 B2
(45) Date of Patent: Aug. 11, 2020

(54) SYSTEM FOR CAPTURING AN IMAGE

(71) Applicant: Ricoh Company, Ltd., Tokyo (JP)

(72) Inventors: Tatsuya Takahashi, Tokyo (JP);
Kazuhiro Fujita, Tokyo (JP); Go Maruyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 305 days.

(21) Appl. No.: 15/763,251

(22) PCT Filed: Sep. 26, 2016

(86) PCT No.: PCT/JP2016/004346
§ 371 (c)(1),
(2) Date: Mar. 26, 2018

(87) PCT Pub. No.: WO2017/056479
PCT Pub. Date: Apr. 6, 2017

(65) Prior Publication Data
US 2018/0272538 A1   Sep. 27, 2018

(30) Foreign Application Priority Data

Sep. 28, 2015  (JP) ................................. 2015-190378
Jul. 22, 2016  (JP) ................................. 2016-144657

(51) Int. Cl.
*B25J 9/16*   (2006.01)
*G02B 5/02*   (2006.01)
(Continued)

(52) U.S. Cl.
CPC ........... *B25J 9/1697* (2013.01); *B25J 9/1664* (2013.01); *G01B 11/2545* (2013.01);
(Continued)

(58) Field of Classification Search
CPC ... B25J 9/16; G02B 5/02; G02B 19/00; G01B 11/25
See application file for complete search history.

(56) References Cited

U.S. PATENT DOCUMENTS 5,625,738 A     4/1997  Magarill
6,905,211 B2 *  6/2005  Fujita .................. H04N 9/3105
                                        348/E9.027
(Continued)

FOREIGN PATENT DOCUMENTS

JP    2002-5843 A    1/2002
JP    2002-27501 A   1/2002
(Continued)

OTHER PUBLICATIONS

International Search Report dated Dec. 6, 2016 in PCT/JP2016/004346 filed on Sep. 26, 2016.
(Continued)

*Primary Examiner* — Kira Nguyen
(74) *Attorney, Agent, or Firm* — Xsensus LLP

(57) ABSTRACT

A system includes: an illumination device; and an imaging device configured to capture an image of a target which is irradiated with light by the illumination device. The illumination device includes: a light emitting unit configured to emit first polarized light; a condensing unit configured to focus light emitted from the light emitting unit; a diffusion unit configured to diffuse the light focused by the condensing unit; and a uniformization optical system configured to receive the light diffused by the diffusion unit, uniformize an illuminance distribution of the light, and emit the light. The system further including a selective transmission unit provided on an optical path from the target to an imaging element of the imaging device and configured to block the first polarized light at a predetermined blocking ratio.

20 Claims, 13 Drawing Sheets

(51) Int. Cl.

| | | |
|---|---|---|
| *G02B 19/00* | (2006.01) | |
| *G01S 17/48* | (2006.01) | |
| *G01B 11/25* | (2006.01) | |
| *G01S 17/89* | (2020.01) | |
| *G01S 7/481* | (2006.01) | |
| *G03B 21/20* | (2006.01) | |
| *G03B 17/54* | (2006.01) | |
| *G03B 7/02* | (2006.01) | |
| *G03B 35/08* | (2006.01) | |
| *G02B 5/30* | (2006.01) | |

(52) U.S. Cl.
CPC ............ *G01S 7/4815* (2013.01); *G01S 17/48* (2013.01); *G01S 17/89* (2013.01); *G02B 5/0278* (2013.01); *G02B 19/0009* (2013.01); *G02B 19/0028* (2013.01); *G02B 19/0085* (2013.01); *G03B 7/02* (2013.01); *G03B 17/54* (2013.01); *G03B 21/208* (2013.01); *G03B 21/2013* (2013.01); *G03B 21/2033* (2013.01); *G03B 21/2073* (2013.01); *G02B 5/30* (2013.01); *G03B 35/08* (2013.01); *Y10S 901/02* (2013.01); *Y10S 901/47* (2013.01)

(56) References Cited

U.S. PATENT DOCUMENTS

| | | | |
|---|---|---|---|
| 7,753,531 B2 | 7/2010 | Fujita et al. | |
| 7,857,458 B2 | 12/2010 | Fujita et al. | |
| 2002/0176255 A1 | 11/2002 | Yamauchi et al. | |
| 2003/0147051 A1* | 8/2003 | Fujita .................. | H04N 9/3105 353/31 |
| 2005/0030489 A1 | 2/2005 | Togino | |
| 2005/0128435 A1 | 6/2005 | Yamauchi et al. | |
| 2006/0126031 A1 | 6/2006 | Kim et al. | |
| 2007/0253076 A1 | 11/2007 | Takaura et al. | |
| 2008/0068563 A1 | 3/2008 | Abe et al. | |
| 2008/0068564 A1 | 3/2008 | Abe et al. | |
| 2008/0297895 A1 | 12/2008 | Fujita et al. | |
| 2009/0066919 A1 | 3/2009 | Fujita et al. | |
| 2009/0141370 A1 | 6/2009 | Takaura et al. | |
| 2009/0153834 A1 | 6/2009 | Gogolla et al. | |
| 2009/0213470 A1 | 8/2009 | Abe et al. | |
| 2009/0310087 A1 | 12/2009 | Itoh et al. | |
| 2010/0053737 A1 | 3/2010 | Fujita et al. | |
| 2010/0157421 A1 | 6/2010 | Abe et al. | |
| 2010/0268069 A1 | 10/2010 | Liang | |
| 2011/0287387 A1 | 11/2011 | Chen et al. | |
| 2012/0019791 A1 | 1/2012 | Abe et al. | |
| 2012/0044465 A1 | 2/2012 | Murai et al. | |
| 2012/0081673 A1* | 4/2012 | Weinold ............. | G02B 27/0101 353/20 |
| 2012/0092628 A1 | 4/2012 | Takahashi et al. | |
| 2012/0133903 A1 | 5/2012 | Tanaka | |
| 2012/0236266 A1 | 9/2012 | Takahashi et al. | |
| 2013/0010264 A1 | 1/2013 | Takahashi et al. | |
| 2013/0021582 A1 | 1/2013 | Fujita et al. | |
| 2013/0070333 A1 | 3/2013 | Takahashi et al. | |
| 2013/0114861 A1 | 5/2013 | Takizawa | |
| 2013/0308104 A1 | 11/2013 | Nishimori et al. | |
| 2014/0002803 A1 | 1/2014 | Abe et al. | |
| 2014/0022357 A1 | 1/2014 | Yu et al. | |
| 2014/0028983 A1 | 1/2014 | Fujita et al. | |
| 2014/0036241 A1 | 2/2014 | Nishimori et al. | |
| 2014/0049755 A1 | 2/2014 | Nishimori et al. | |
| 2014/0071182 A1 | 3/2014 | Takahashi et al. | |
| 2014/0071407 A1 | 3/2014 | Takahashi et al. | |
| 2014/0071408 A1 | 3/2014 | Takahashi et al. | |
| 2014/0240679 A1 | 8/2014 | Nishimori et al. | |
| 2014/0240680 A1 | 8/2014 | Nishimori et al. | |
| 2014/0247429 A1 | 9/2014 | Ogino et al. | |
| 2014/0268068 A1 | 9/2014 | Takahashi et al. | |
| 2014/0268069 A1 | 9/2014 | Takahashi et al. | |
| 2014/0268072 A1 | 9/2014 | Takahashi et al. | |
| 2014/0340649 A1 | 11/2014 | Takahashi et al. | |
| 2015/0042963 A1 | 2/2015 | Nishimori et al. | |
| 2015/0125035 A1 | 5/2015 | Miyatani et al. | |
| 2015/0131096 A1 | 5/2015 | Hatada et al. | |
| 2015/0253653 A1 | 9/2015 | Fujita et al. | |
| 2015/0261899 A1 | 9/2015 | Atohira et al. | |
| 2015/0316840 A1 | 11/2015 | Maeda et al. | |
| 2016/0091784 A1 | 3/2016 | Hu et al. | |
| 2016/0103387 A1 | 4/2016 | Nishimori et al. | |
| 2016/0109221 A1 | 4/2016 | Takahashi et al. | |
| 2016/0131967 A1 | 5/2016 | Saitou | |
| 2016/0170199 A1* | 6/2016 | Inoue ..................... | G03B 21/14 |
| 2016/0195718 A1* | 7/2016 | Evans .................. | G02B 5/0294 345/8 |

FOREIGN PATENT DOCUMENTS

| | | |
|---|---|---|
| JP | 2003-229700 A | 8/2003 |
| JP | 2005-62312 A | 3/2005 |
| JP | 2005-214787 A | 8/2005 |
| JP | 2006-171725 A | 6/2006 |
| JP | 2007-280793 A | 10/2007 |
| JP | 2009-145340 A | 7/2009 |
| JP | 2010-060912 A | 3/2010 |
| JP | 2011-65770 A | 3/2011 |
| JP | 2011-130138 A | 6/2011 |
| JP | 2012-133337 A | 7/2012 |
| JP | 2012-177671 A | 9/2012 |
| JP | 2013-101045 A | 5/2013 |
| JP | 2013-222056 A | 10/2013 |
| JP | 2013-257162 A | 12/2013 |
| JP | 2014-170037 A | 9/2014 |
| JP | 2015-94756 A | 5/2015 |
| JP | 2015-145975 A | 8/2015 |
| JP | 2015-161801 A | 9/2015 |
| JP | 2016-081898 A | 5/2016 |
| WO | WO 2014/183581 A1 | 11/2014 |
| WO | WO 2014/196020 A1 | 12/2014 |
| WO | WO 2015/130071 A1 | 9/2015 |

OTHER PUBLICATIONS

Written Opinion dated Dec. 6, 2016 in PCT/JP2016/004346 filed on Sep. 26, 2016.

Notification of Reasons for Refusal dated Oct. 27, 2016 in Japanese Patent Application No. 2016-144657 (with English language translation).

Notification of Reasons for Refusal dated Mar. 9, 2017 in Japanese Patent Application No. 2016-144657 (with English language translation).

Extended European Search Report dated Aug. 21, 2018 in Patent Application No. 16850658.2, 11 pages.

* cited by examiner

[Fig. 1]
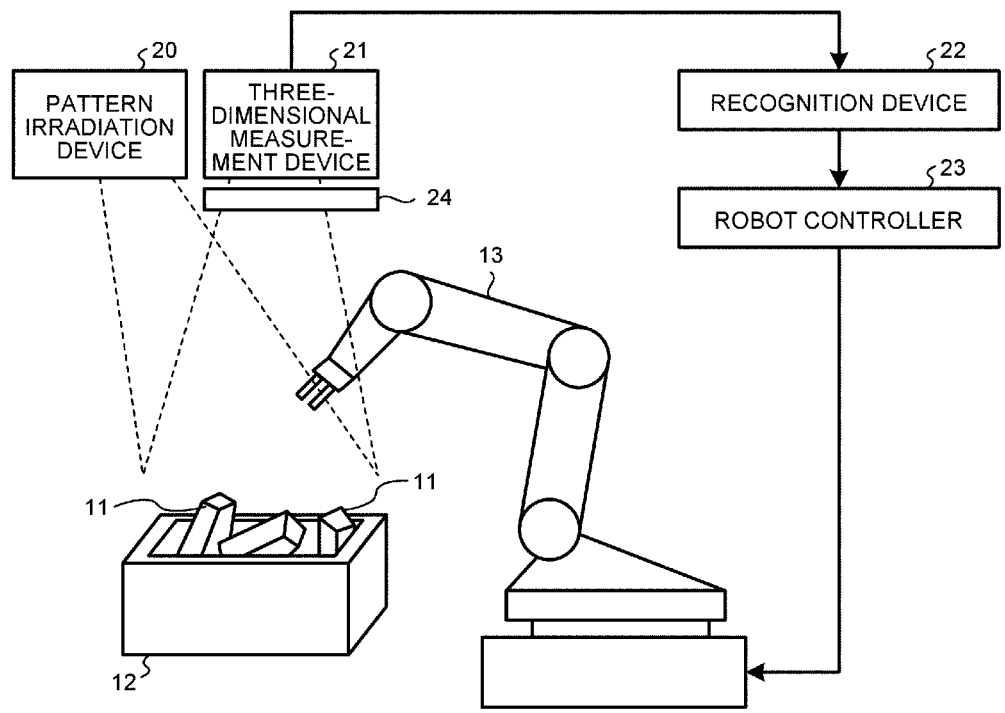
[Fig. 2]
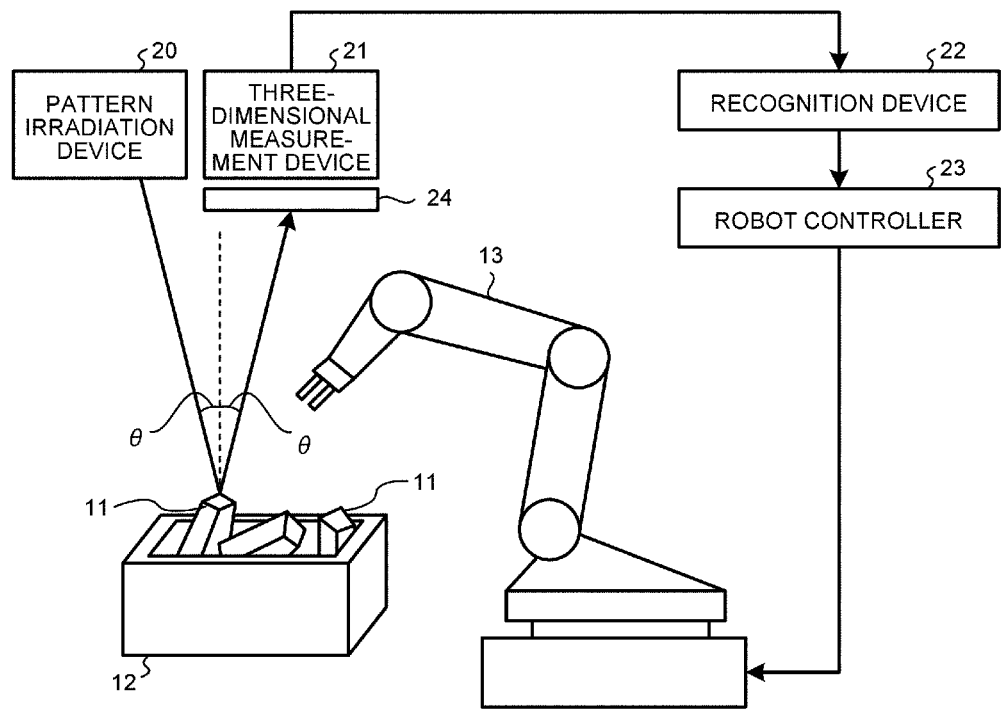

[Fig. 3]
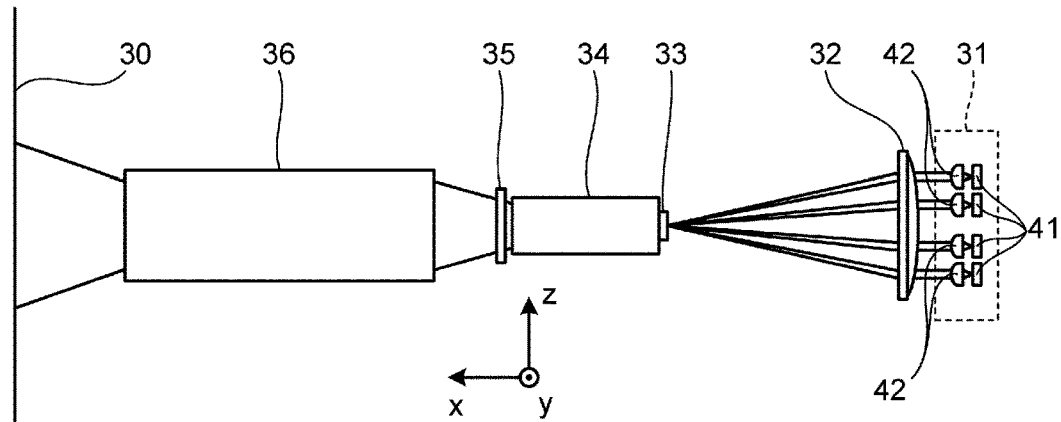
[Fig. 4]
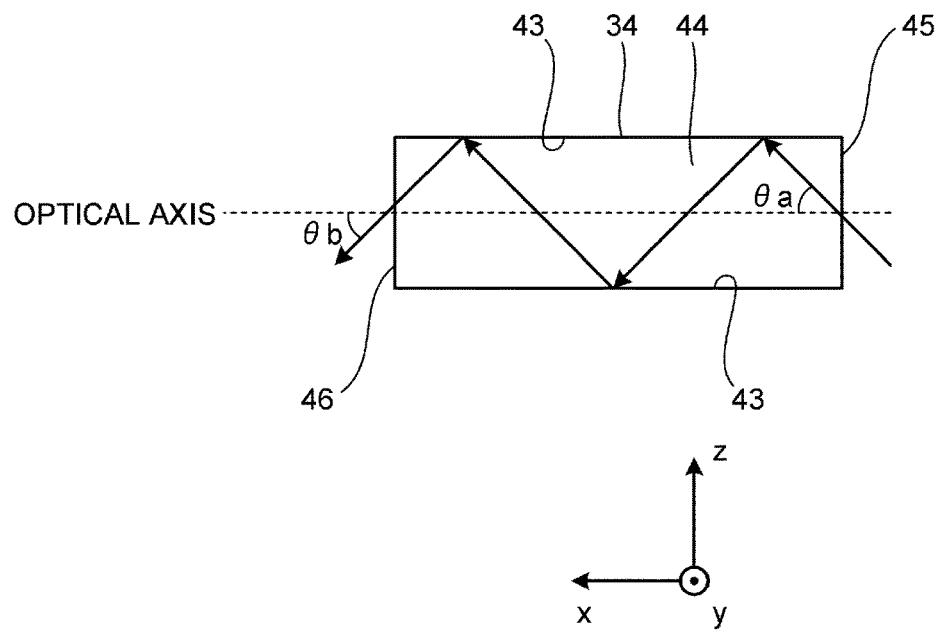
[Fig. 5]
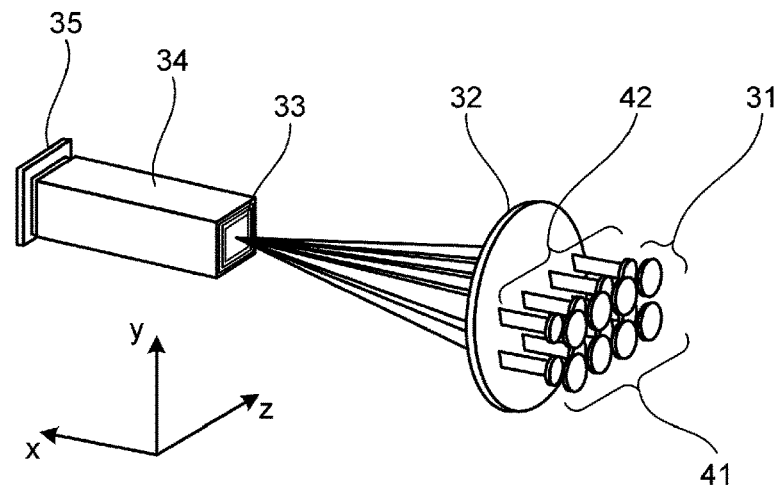

[Fig. 6]
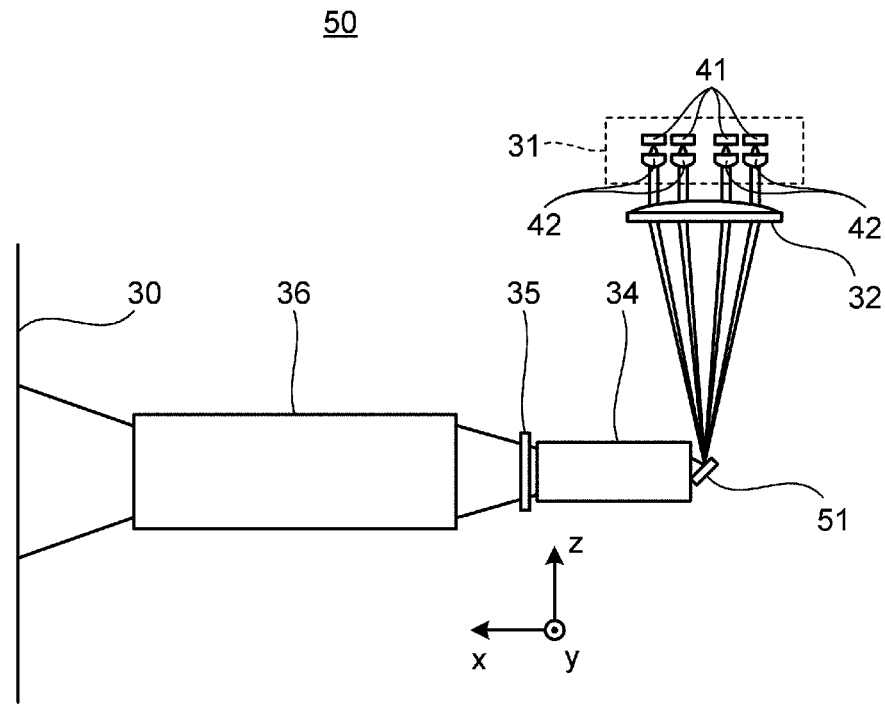
[Fig. 7]
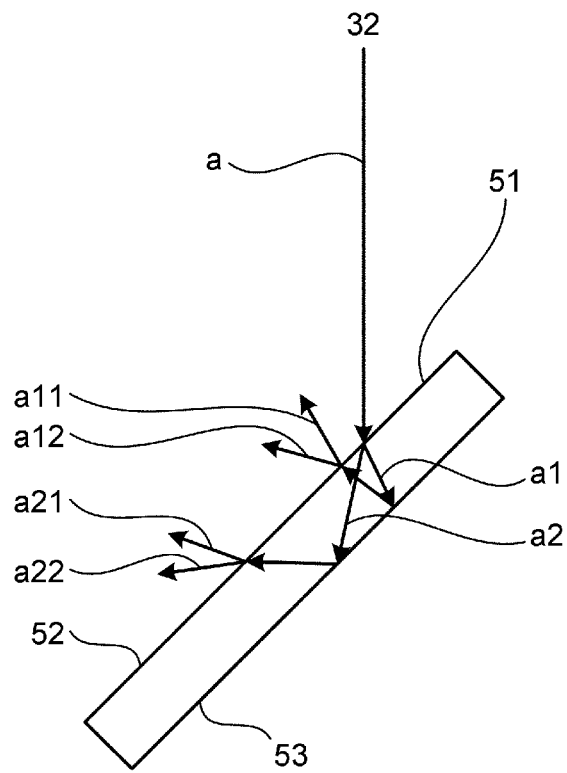

[Fig. 8]
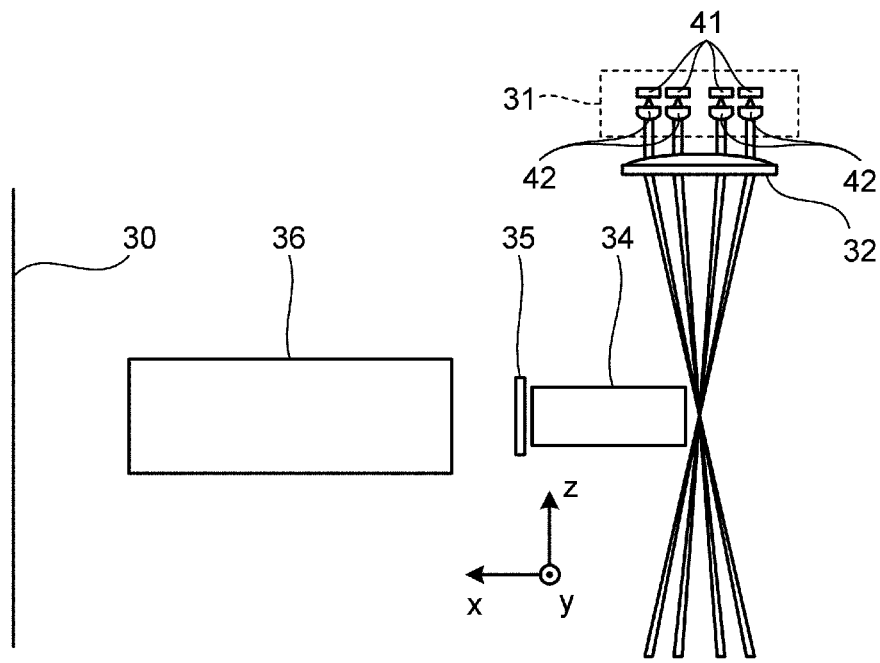
[Fig. 9]
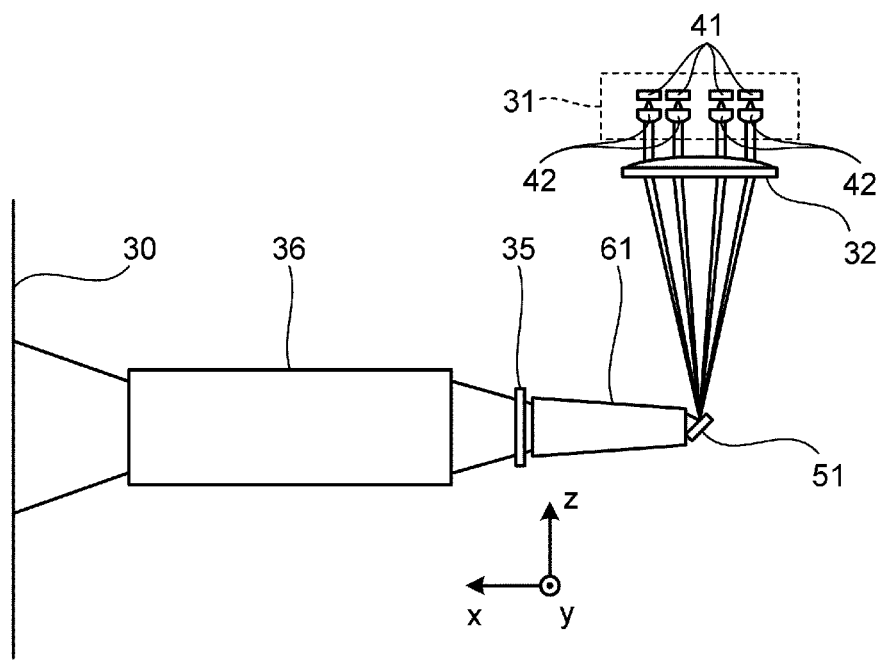

[Fig. 10]
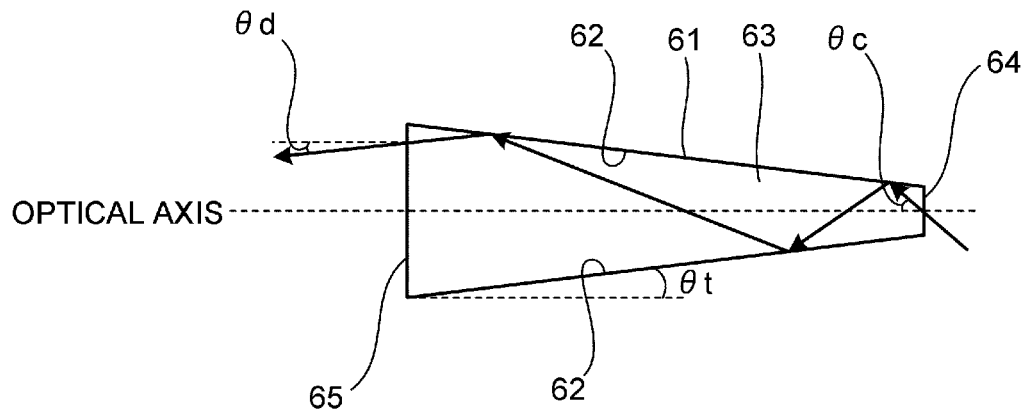
[Fig. 11]
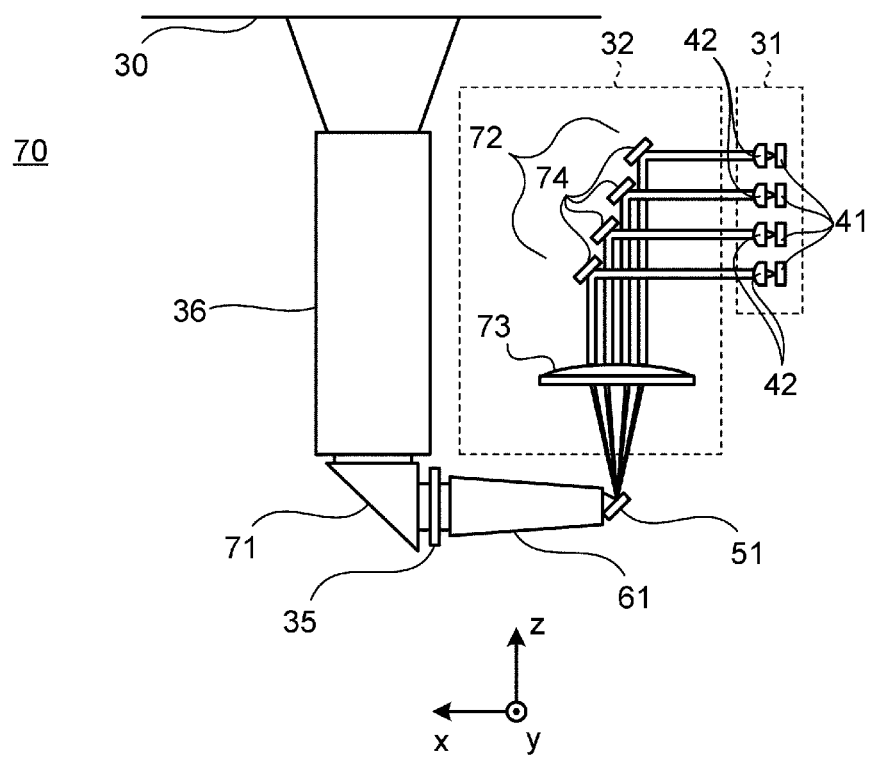

[Fig. 12]
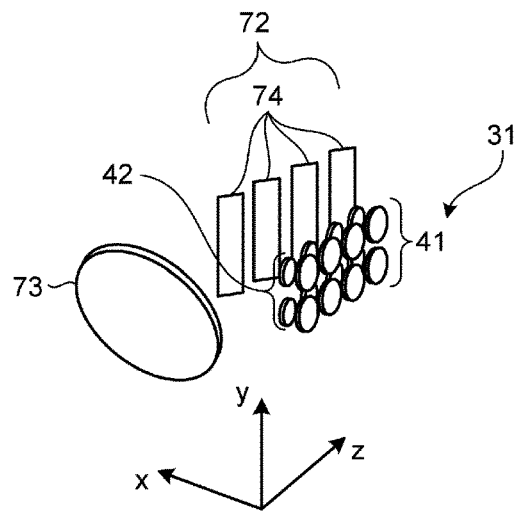
[Fig. 13A]
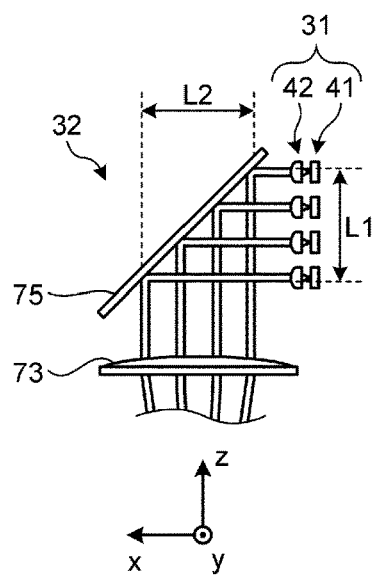
[Fig. 13B]
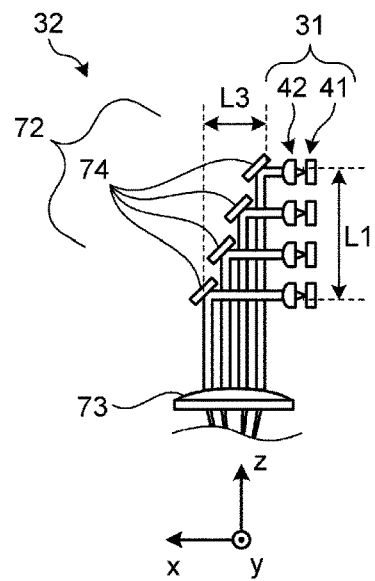

[Fig. 14]
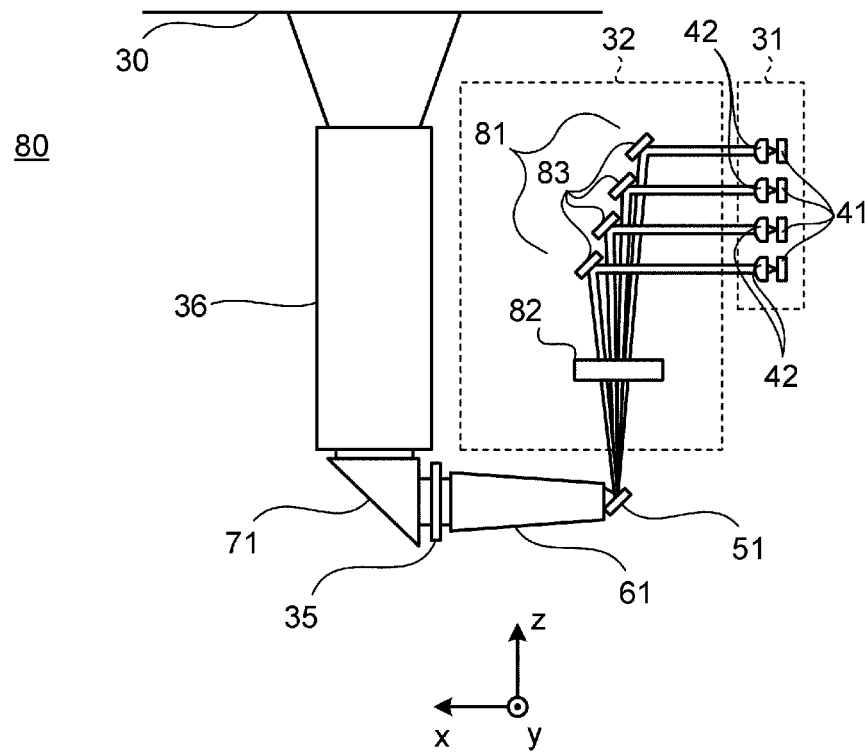
[Fig. 15]
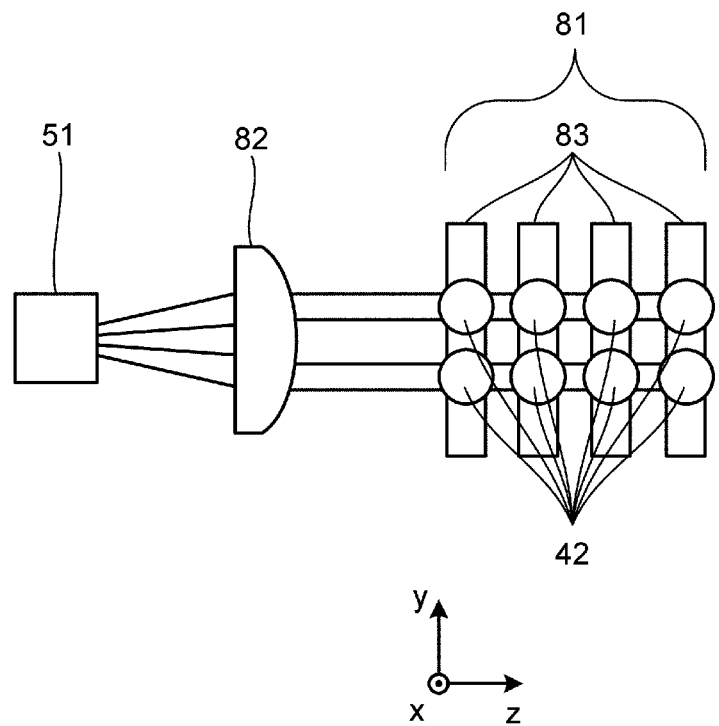

[Fig. 16]
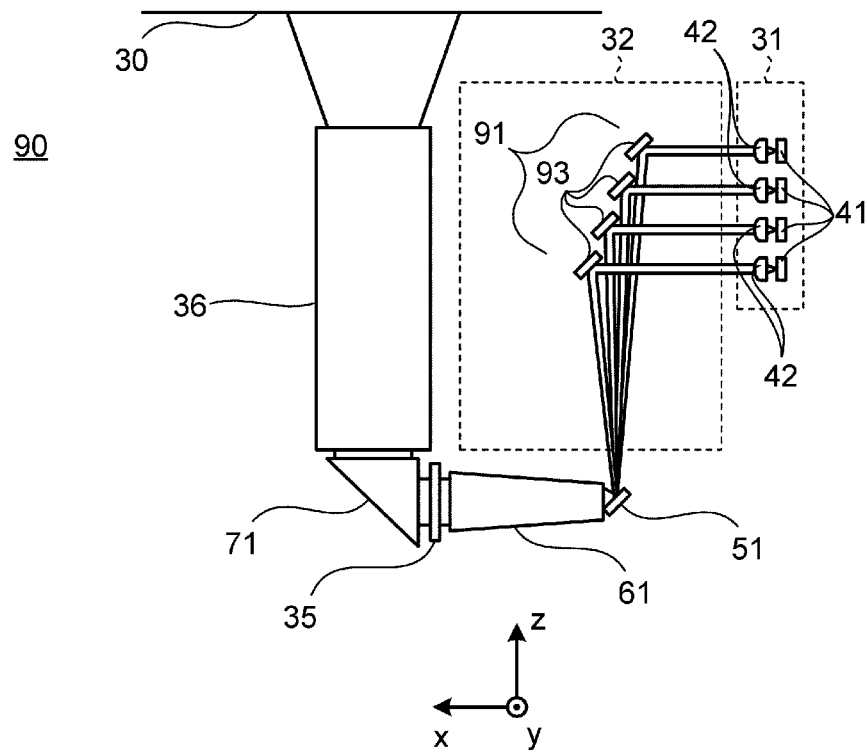
[Fig. 17]
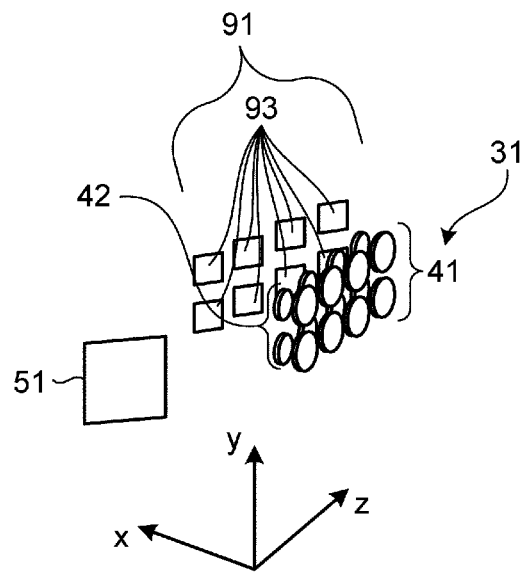

[Fig. 18]
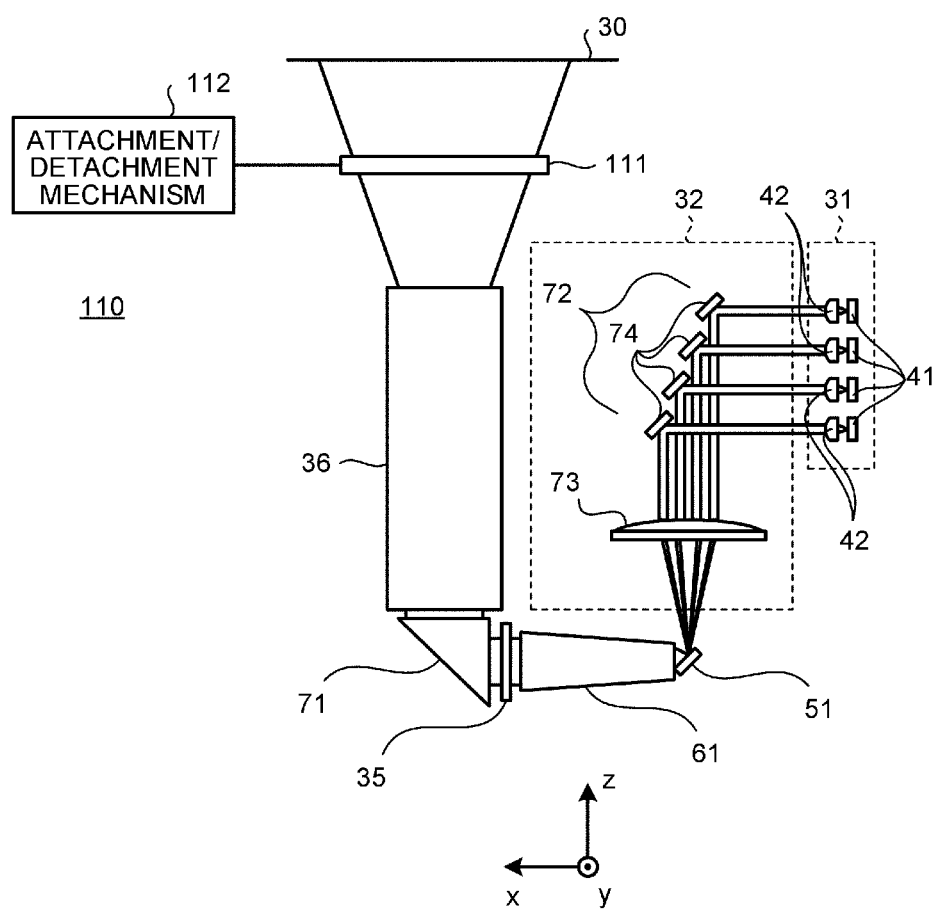

[Fig. 19]
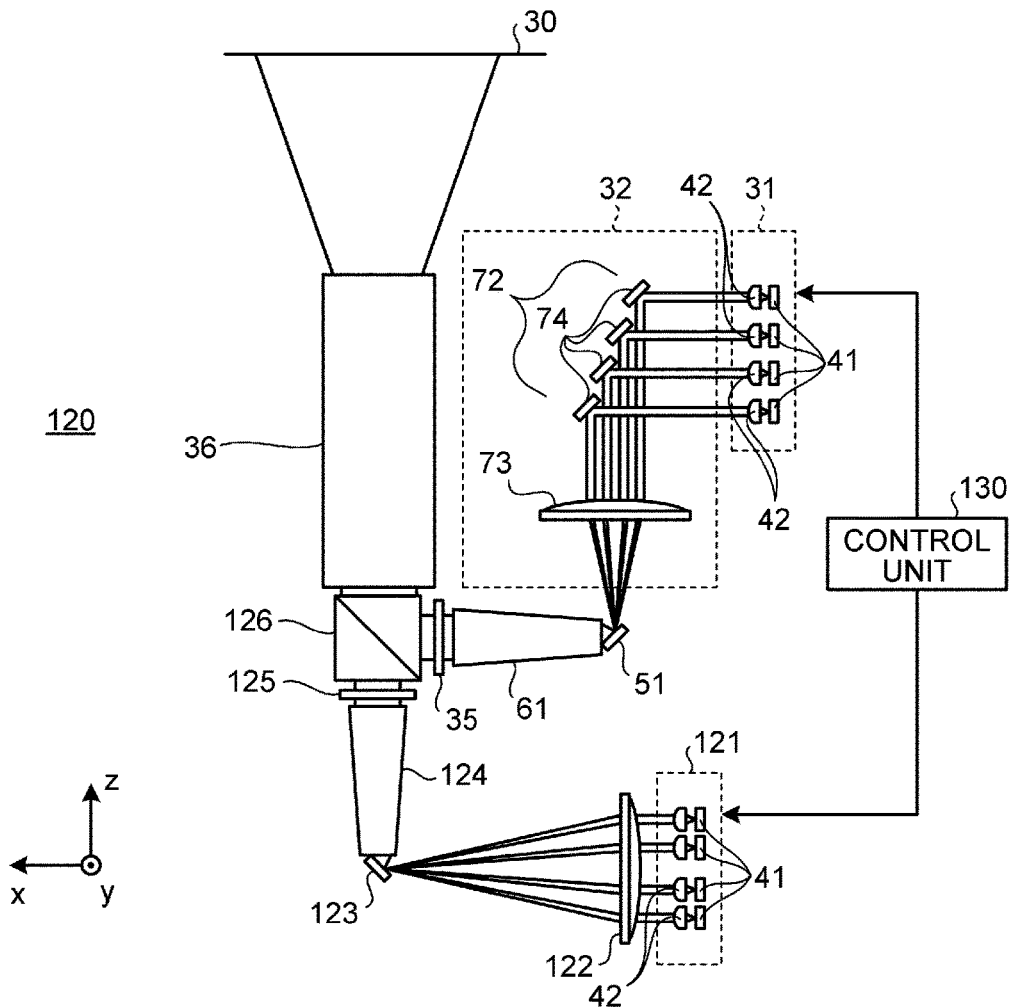
[Fig. 20]
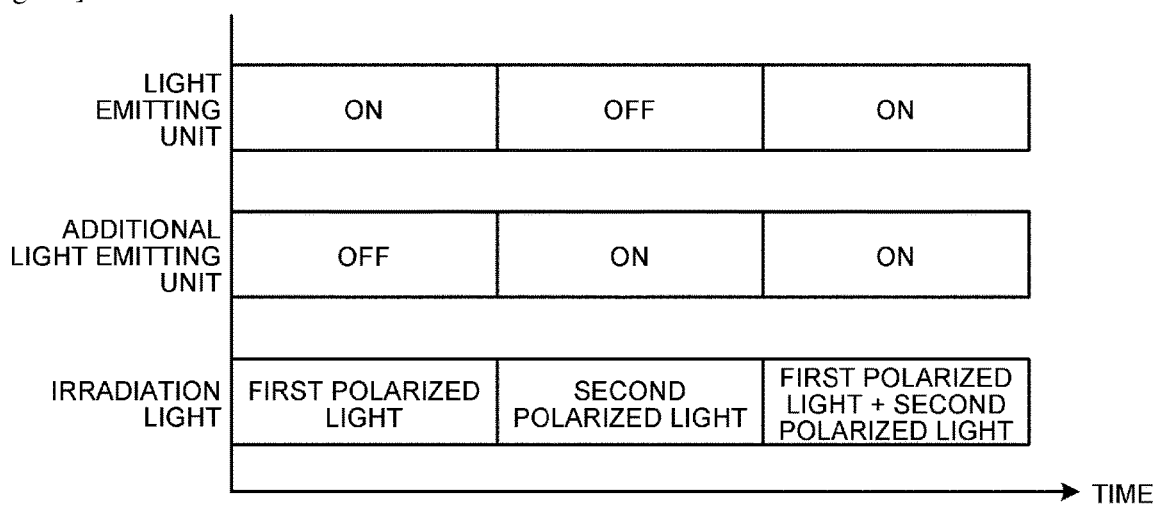

[Fig. 21]
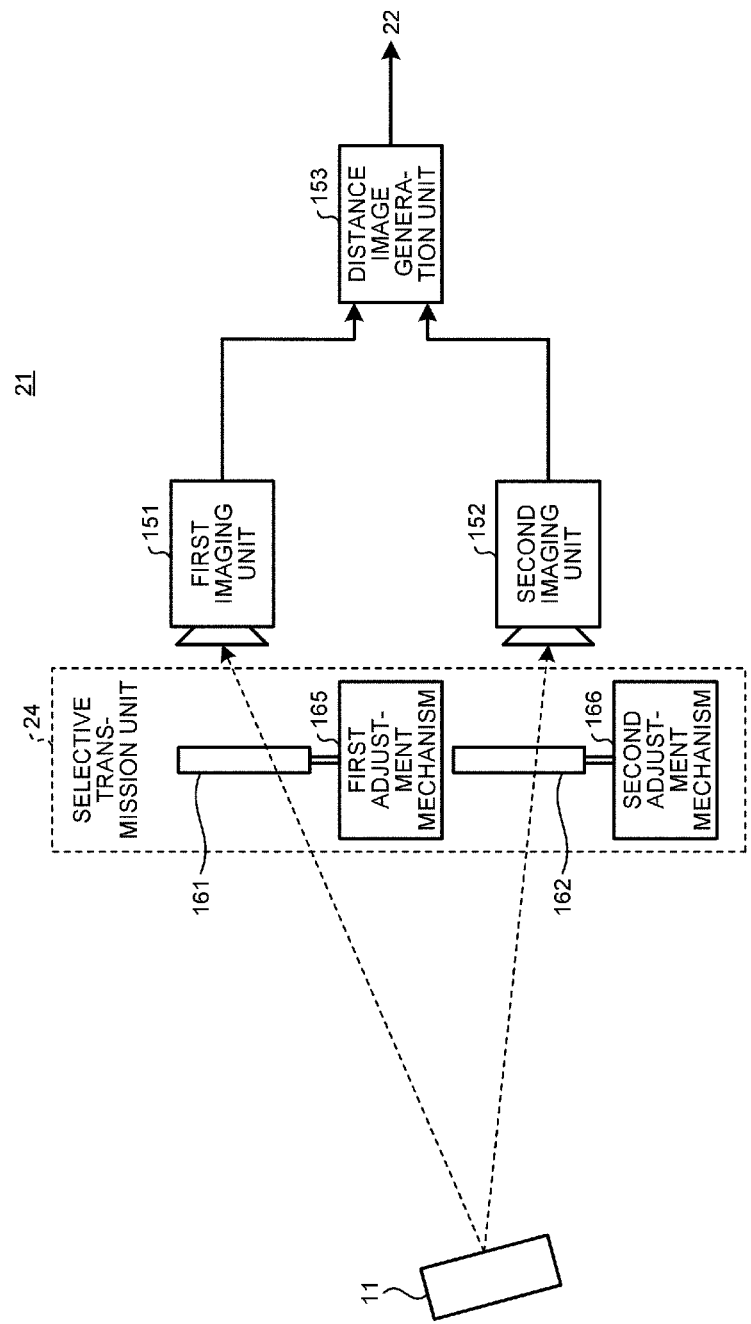

[Fig. 22]
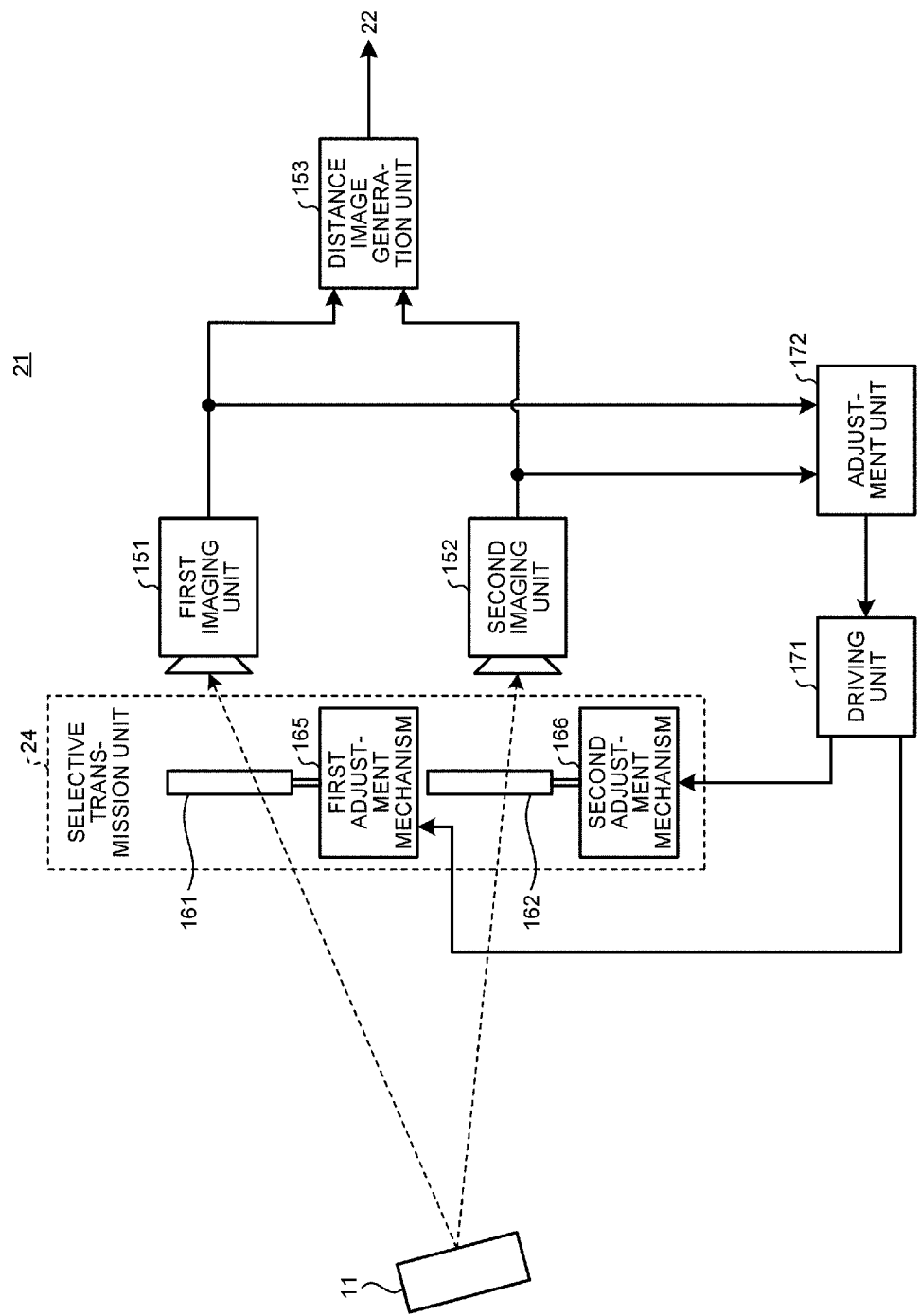

[Fig. 23]
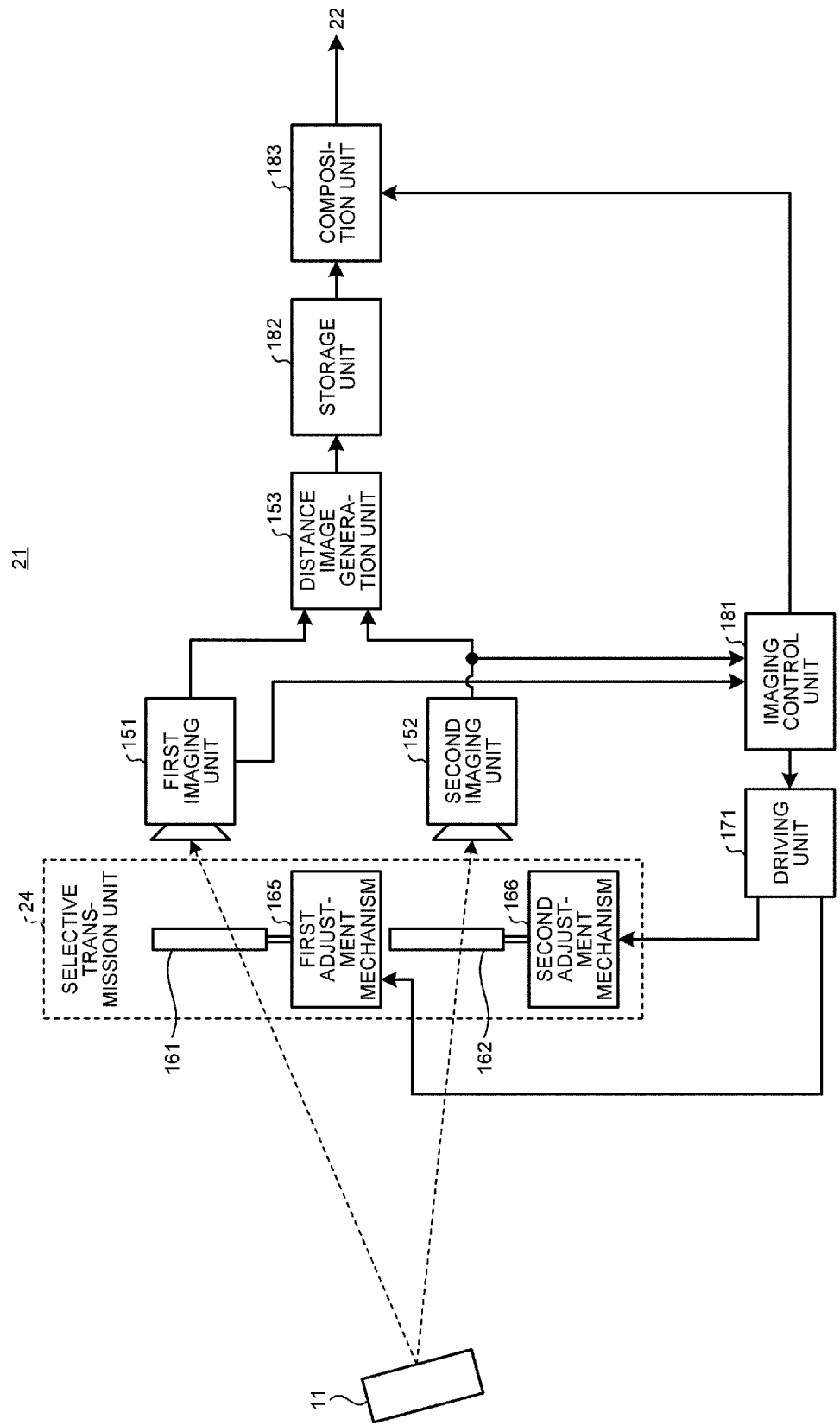

SYSTEM FOR CAPTURING AN IMAGE

TECHNICAL FIELD

The present invention relates to a system.

BACKGROUND ART

In recent years, a system has been known which handles a target (work) placed on a tray, using a robot, to transport the target to a device corresponding to the next process or assembles a product using the target. In the system, an imaging device recognizes the position and orientation of the target placed on the tray and the target is handled. In addition, in the system, an illumination device irradiates the target on the tray with light, which makes it possible to improve the accuracy of measurement by the imaging device (for example, PTL1 and PTL2).

SUMMARY OF INVENTION

Technical Problem

However, in the system according to the related art, the accuracy of recognition of a target is likely to be affected by the type of target irradiated with light.

The invention has been made in view of the above-mentioned problems and an object of the invention is to provide a system that can prevent a reduction in the accuracy of recognition of a target.

Solution to Problem

To solve the above-described problem and to achieve the object, a system according to the present invention is a system including an illumination device and an imaging device configured to capture an image of a target which is irradiated with light by the illumination device. The illumination device includes a light emitting unit, a condensing unit, a diffusion unit, and a uniformization optical system. The light emitting unit is configured to emit first polarized light. The condensing unit is configured to focus light emitted from the light emitting unit. The diffusion unit is configured to diffuse the light focused by the condensing unit. The uniformization optical system is configured to receive the light diffused by the diffusion unit, uniformize an illuminance distribution of the light, and emit the light. The system further includes a selective transmission unit provided on an optical path from the target to an imaging element of the imaging device and configured to block the first polarized light at a predetermined blocking ratio.

Advantageous Effects of Invention

According to the invention, it is possible to prevent a reduction in the accuracy of recognition of a target.

BRIEF DESCRIPTION OF DRAWINGS

FIG. 1 is a diagram illustrating a handling system according to a first embodiment.

FIG. 2 is a diagram illustrating an example of an optical path of light that is directly reflected from a target in the handling system according to the first embodiment.

FIG. 3 is a diagram illustrating the structure of a pattern irradiation device according to the first embodiment.

FIG. 4 is a diagram illustrating an example of an optical path in a light tunnel.

FIG. 5 is a perspective view illustrating a portion of the pattern irradiation device according to the first embodiment.

FIG. 6 is a diagram illustrating the structure of a pattern irradiation device according to a second embodiment.

FIG. 7 is a diagram illustrating an example of an optical path in a reflecting/diffusion plate.

FIG. 8 is a diagram illustrating an example of an optical path when the reflecting/diffusion plate is detached.

FIG. 9 is a diagram illustrating the structure of a pattern irradiation device according to a third embodiment.

FIG. 10 is a diagram illustrating an example of an optical path in a tapered light tunnel.

FIG. 11 is a diagram illustrating the structure of a pattern irradiation device according to a fourth embodiment.

FIG. 12 is a diagram illustrating an example of the arrangement of, for example, a first mirror group and a lens according to the fourth embodiment.

FIG. 13A is a diagram illustrating an optical path when a single-plate mirror is used.

FIG. 13B is a diagram illustrating an optical path when a first mirror group is used.

FIG. 14 is a diagram illustrating the structure of a pattern irradiation device according to a fifth embodiment.

FIG. 15 is a diagram illustrating an example of the arrangement of, for example, a second mirror group and a cylindrical lens according to the fifth embodiment.

FIG. 16 is a diagram illustrating the structure of a pattern irradiation device according to a sixth embodiment.

FIG. 17 is a diagram illustrating an example of the arrangement of, for example, a third mirror group according to the sixth embodiment.

FIG. 18 is a diagram illustrating the structure of a pattern irradiation device according to a seventh embodiment.

FIG. 19 is a diagram illustrating the structure of a pattern irradiation device according to an eighth embodiment.

FIG. 20 is a diagram illustrating an example of a method for switching irradiation light in the pattern irradiation device according to the eighth embodiment.

FIG. 21 is a diagram illustrating the structure of a three-dimensional measurement device according to a ninth embodiment.

FIG. 22 is a diagram illustrating the structure of a three-dimensional measurement device according to a tenth embodiment.

FIG. 23 is a diagram illustrating the structure of a three-dimensional measurement device according to an eleventh embodiment.

DESCRIPTION OF EMBODIMENTS

Hereinafter, handling systems 10 according to embodiments of the invention will be described in detail with reference to the accompanying drawings.

First Embodiment

FIG. 1 is a diagram illustrating a handling system 10 according to a first embodiment. The handling system 10 handles a target 11 (work) to transport the target 11 to a device corresponding to the next process or assembles a product using the target 11.

The handling system 10 includes a tray 12, a robot 13, a pattern irradiation device 20 (illumination device), a three-dimensional measurement device 21 (imaging device), a recognition device 22, and a robot controller 23. The tray 12 has at least one target 11 placed thereon.

The robot 13 handles any one of the targets 11 placed on the tray 12, using an arm, and moves the handled target 11 to a designated position or maintains the handled target 11 in a designated orientation. The robot 13 may open and close claws such that the target 11 is interposed therebetween and handle the target 11, may handle the target 11 using air attraction, or may handle the target 11 using electromagnetic force.

The pattern irradiation device 20 irradiates the tray 12 having the targets 11 placed thereon with first polarized light with a predetermined monochromatic image pattern. Then, an exposed portion of the surface of each target 11 placed on the tray 12 is irradiated with light with a predetermined image pattern. In this embodiment, the pattern irradiation device 20 emits blue image pattern light. However, the color is not limited to blue and may be white.

The three-dimensional measurement device 21 measures the distance to the position of the exposed surface of each target 11 placed on the tray 12 in a state in which the pattern irradiation device 20 emits the first polarized light with a predetermined image pattern. The three-dimensional measurement device 21 includes a selective transmission unit 24 that blocks the first polarized light and transmits polarized light other than the first polarized light. The three-dimensional measurement device 21 captures an image of light which has been reflected from the target 11 and has passed through the selective transmission unit 24 and measures the distance to the target 11. That is, the three-dimensional measurement device 21 captures polarized light other than the first polarized light among the polarized light components reflected from the target 11 and measures the distance to the target 11. For example, the three-dimensional measurement device 21 measures the distance, using a stereo camera, and generates three-dimensional information indicating the distance to each position of the image.

The recognition device 22 recognizes the position and orientation of each target 11 on the basis of the distance to each position of the surface of each target 11 measured by the three-dimensional measurement device 21. For example, the recognition device 22 performs a matching process with a three-dimensional model or a matching process, such as a surface matching process, and recognizes the position and orientation of each target 11. In addition, the recognition device 22 may perform, for example, edge extraction on the basis of illuminance information to supplement the matching process.

The robot controller 23 controls the operation of the robot 13 on the basis of the position and orientation of each target 11 recognized by the recognition device 22, according to a control flow which is registered in advance. Then, the robot controller 23 performs control such that the robot handles the designated target 11 on the tray 12.

In the handling system 10, the pattern irradiation device 20 irradiates each target 11 placed on the tray 12 with the first polarized light with an image pattern for improving the accuracy of three-dimensional measurement by the three-dimensional measurement device 21. Then, the three-dimensional measurement device 21 captures polarized light other than the first polarized light and measures the distance to the target 11. According to the handling system 10, it is possible to recognize the position and orientation of each target 11 placed on the tray 12 with high accuracy and to handle the target 11 with high accuracy.

FIG. 2 is a diagram illustrating an example of the optical path of light directly reflected from the target 11 in the handling system 10 according to the first embodiment.

The first polarized light that is emitted from the pattern irradiation device 20 to the target 11 is, for example, light that is linearly polarized in a predetermined direction. The first polarized light may be, for example, circularly polarized light that rotates in a predetermined direction. The selective transmission unit 24 of the three-dimensional measurement device 21 is, for example, a polarizing filter that blocks the first polarized light and transmits polarized light other than the first polarized light. For example, when the first polarized light is linearly polarized light, the selective transmission unit 24 blocks the first polarized light and transmits second polarized light perpendicular to the first polarized light. When the first polarized light is circularly polarized light, the selective transmission unit 24 blocks the first polarized light and transmits the second polarized light that rotates in a direction opposite to the direction of the first polarized light. The selective transmission unit 24 may be disposed on an optical path from the target 11 to an imaging element (for example, a CCD) of the three-dimensional measurement device 21 and may be provided separately from the three-dimensional measurement device 21. The selective transmission unit 24 may be disposed at any position on the optical path from the target 11 to the imaging element of the three-dimensional measurement device 21 and may be provided integrally with the three-dimensional measurement device 21. In this case, the selective transmission unit 24 blocks the first polarized light reflected from the target 11 and transmits polarized light other than the first polarized light reflected from the target 11 so as to be incident on the three-dimensional measurement device 21.

When the pattern irradiation device 20 irradiates the target 11 placed on the tray 12 with the first polarized light, light reflected from the target 11 includes directly reflected light and diffusely reflected light. The difference between the amount of directly reflected light and the amount of diffusely reflected light is large. Therefore, when the directly reflected light is captured, a dynamic range is insufficient and the accuracy of recognition of the three-dimensional measurement device 21 is reduced.

In FIG. 2, it is assumed that a light emission surface of the pattern irradiation device 20, a light incident surface of the three-dimensional measurement device 21, and the surface of the target 11 are parallel to one another. In addition, it is assumed that an angle formed between the traveling direction of light emitted from the pattern irradiation device 20 to the target 11 and a line normal to the surface of the target 11 is θ. In this case, light that is directly reflected from the surface of the target 11 travels in a direction that is inclined from the line normal to the surface of the target 11 to the three-dimensional measurement device 21 at an angle of θ. The directly reflected light is captured as gloss by the three-dimensional measurement device 21. As a result, the dynamic range is insufficient and the accuracy of recognition is reduced.

It is considered that the distance between the pattern irradiation device 20 and the three-dimensional measurement device 21 increases in order to prevent the directly reflected light from being incident on the three-dimensional measurement device 21. However, when the pattern irradiation device 20 and the three-dimensional measurement device 21 are disposed in this way, the occupied space of the devices in the entire system increases and usability is reduced. In addition, when the targets 11 are placed on the tray 12 in various directions, it is very difficult to make light that is directly reflected from all of the targets 11 incident on the three-dimensional measurement device 21.

Here, light (directly reflected light) that is directly reflected from the target 11 is maintained in a polarized state. In contrast, the polarized state of the diffusely reflected light is disordered. That is, when the first polarized light is incident on the target 11, the directly reflected light is also the first polarized light. However, the polarized state of the diffusely reflected light is disordered and diffusely reflected light includes the second polarized light.

In the handling system 10 according to this embodiment, the pattern irradiation device 20 irradiates the target 11 with the first polarized light and the selective transmission unit 24 of the three-dimensional measurement device 21 blocks the first polarized light and transmits polarized light other than the first polarized light. Then, the three-dimensional measurement device 21 captures the light transmitted through the selective transmission unit 24 and measures the distance to the target 11. In this way, the three-dimensional measurement device 21 can receive diffusely reflected light other than the light which is directly reflected from the target 11. Therefore, the three-dimensional measurement device 21 can prevent the accuracy of recognition from being reduced due to an insufficient dynamic range.

According to the handling system 10, it is possible to recognize the position and orientation of each target 11 placed on the tray 12 with high accuracy and to handle the target 11 with high accuracy.

FIG. 3 is a diagram illustrating the structure of the pattern irradiation device 20 according to the first embodiment. The pattern irradiation device 20 irradiates a projection surface 30 with image pattern light for improving the measurement accuracy of the distance by the three-dimensional measurement device 21. The projection surface 30 corresponds to the tray 12 on which the targets 11 are placed in the handling system 10.

The pattern irradiation device 20 includes a light emitting unit 31, a condensing unit 32, a transmission/diffusion plate 33, a light tunnel 34, an image forming unit 35, and an irradiation optical system 36.

In FIG. 3, x, y, and z indicate directions that are perpendicular to one another. The x direction indicates a direction parallel to the optical axis of the light tunnel 34. The y direction indicates a direction perpendicular to the x direction. The z direction indicates a direction perpendicular to the x direction and the y direction.

The light emitting unit 31 emits the first polarized light. In this embodiment, the light emitting unit 31 emits laser beams, which are a plurality of parallel beams of first pre-determined polarized light, in the same direction.

The light emitting unit 31 includes a plurality of laser diodes 41, which are light sources, and a plurality of collimator lenses 42. The plurality of laser diodes 41 emit first polarized laser beams, which are coherent light, in the same direction. In this embodiment, each laser diode 41 is a blue laser diode which emits a blue laser beam with a wavelength that is, for example, equal to or greater than 440 nm and is equal to or less than 500 nm. Each laser diode 41 is not limited to the blue laser diode and may be diodes of other colors. In addition, the laser diode 41 may emit laser beams other than visible light as long as the three-dimensional measurement device 21 can detect the emitted light.

The plurality of collimator lenses 42 are provided in one-to-one correspondence with the plurality of laser diodes 41. The collimator lenses 42 receive the laser beams emitted from the corresponding laser diodes 41 and emit the laser beams as parallel beams. Therefore, the light emitting unit 31 can emit laser beams, which are a plurality of parallel beams, in the same direction.

The condensing unit 32 focuses the first polarized light emitted from the light emitting unit 31 on the transmission/diffusion plate 33. In this embodiment, the condensing unit 32 is a lens and focuses a plurality of laser beams substantially on one point of the transmission/diffusion plate 33.

The transmission/diffusion plate 33 is a diffusion unit that diffuses incident light. The transmission/diffusion plate 33 has a flat plate shape as a whole. For example, fine uneven portions are randomly formed on at least one surface of the transmission/diffusion plate 33. The transmission/diffusion plate 33 receives a plurality of laser beams focused by the condensing unit 32 and emits the incident light to the light tunnel 34 while transmitting and diffusing the incident light. For example, the transmission/diffusion plate 33 diffuses light at a diffusion angle that is equal to or greater than 5° and is equal to or less than 10° which is the full width at half maximum.

The light tunnel 34 is a uniformization optical system that uniformizes an illuminance distribution of a plane (the y direction and the z direction) perpendicular to the optical axis direction (x direction) of traveling light. The light tunnel 34 receives the light diffused by the transmission/diffusion plate 33, transmits the incident light, uniformizes the illuminance distribution of the light, and emits the light. The light tunnel 34 transmits the incident light such that the illuminance distribution of light emitted from the light tunnel 34 is more uniform than at least the incident light.

The image forming unit 35 transmits and blocks (or reflects) the light emitted from the light tunnel 34 according to a predetermined image pattern to form an image with a predetermined image pattern on a plane perpendicular to the optical axis. Light that is transmitted through the image forming unit 35 is incident on the irradiation optical system 36. The predetermined image pattern is a two-dimensional pattern that improves the measurement accuracy of the distance when emitted to the target 11.

For example, the image forming unit 35 is a photomask with a rectangular plate shape which is obtained by drawing a predetermined image pattern on a transparent plate such as a glass plate. The image forming unit 35 may be a plate-shape transmissive liquid crystal element which can form a transmissive image pattern on the basis of an electric signal. In this case, the image forming unit 35 can form an image pattern according to image data transmitted from an external information processing device.

The irradiation optical system 36 enlarges the light transmitted through the image forming unit 35 with a designated magnification and emits the light to the projection surface 30.

FIG. 4 is a diagram illustrating an example of the optical path in the light tunnel 34.

As illustrated in FIG. 4, the light tunnel 34 has a cylindrical shape and has a reflecting side surface 43 reflecting light inward in the cylinder. In the light tunnel 34, the inside of the cylinder functions as an optical path 44 that transmits light. The optical path 44 may be a hollow path or may be filled with a transparent material, such as glass, as long as it can transmit light.

The light diffused by the transmission/diffusion plate 33 is incident on the optical path 44 through an inlet 45. The incident light is transmitted through the optical path 44 while being reflected from the reflecting side surface 43. Then, the light transmitted through the optical path 44 is emitted to the outside through an outlet 46. Light that is incident on the light tunnel 34 passes through the inside of the optical path 44 while being reflected from the reflecting side surface 43. Therefore, the light tunnel 34 can uniformize the illuminance distribution of light that is emitted.

The reflecting side surface 43 of the light tunnel 34 is provided in parallel to the optical axis. Therefore, the incident angle θa of light on the light tunnel 34 is equal to the emission angle θb of light from the light tunnel 34. Therefore, the light tunnel 34 can emit light at the same diffusion angle as the transmission/diffusion plate 33.

In this embodiment, a plane of the light tunnel 34 which is perpendicular to the optical axis direction (x direction) has a rectangular shape. It is preferable that the plane of the light tunnel 34 which is perpendicular to the optical axis have substantially the same aspect ratio as the image forming unit 35.

The outlet 46 of the light tunnel 34 may have a sufficient size to irradiate at least the entire surface of the image forming unit 35 in the subsequent stage with light. When the outlet 46 is larger than the image forming unit 35 provided in the subsequent stage, light emitted from the outlet 46 leaks outside the image forming unit 35 and is wasted. Therefore, it is preferable that the outlet 46 have substantially the same size as the image forming unit 35, considering, for example, the accuracy of assembly.

As the length of the light tunnel 34 in the optical axis direction increases, the number of times light is reflected in the optical path 44 increases and the illuminance distribution of light becomes more uniform. However, in this case, loss increases. Therefore, it is preferable that the length of the light tunnel 34 in the optical axis direction be the minimum in the range in which target uniformity is obtained.

In some cases, the light tunnel 34 is called a homogenizer or a light pipe. The pattern irradiation device 20 may include members other than the light tunnel 34 as long as it is a uniformization optical system that makes the illuminance distribution of emission light more uniform than incident light. For example, the pattern irradiation device 20 may include a fly eye instead of the light tunnel 34.

FIG. 5 is a perspective view illustrating a portion of the pattern irradiation device 20 according to the first embodiment. For example, the light emitting unit 31 includes eight laser diodes 41 which are arranged in a 2×4 matrix. In addition, the light emitting unit 31 includes eight collimator lenses 42 corresponding to the laser diodes 41. The light emitting unit 31 can emit eight parallel beams in the same direction.

As such, since the light emitting unit 31 includes a plurality of laser diodes 41, it is possible to increase the energy of light emitted from the light emitting unit 31. The light emitting unit 31 may have any number of laser diodes 41 and any array of laser diodes 41 as long as it can emit laser beams in the same direction.

The transmission/diffusion plate 33 is provided immediately before the light tunnel 34, without passing through, for example, a relay optical system interposed. Therefore, in the pattern irradiation device 20, it is possible to reduce the optical distance between the transmission/diffusion plate 33 and the light tunnel 34 and to prevent diffused light from leaking outside the light tunnel 34. As a result, in the pattern irradiation device 20, it is possible to increase the transmission efficiency of light and to increase output energy.

The condensing unit 32 focuses a plurality of laser beams emitted from the light emitting unit 31 on the transmission/diffusion plate 33. Therefore, even if the number of laser diodes 41 in the light emitting unit 31 increases, light emitted from the laser diode 41 can be incident on the light tunnel 34 without leakage. As a result, it is possible to easily increase energy output from the pattern irradiation device 20.

A laser beam has high directionality. If a laser beam that is emitted from the collimator lens 42 is directly incident on the light tunnel 34, it is difficult for the light tunnel 34 to effectively uniformize an illuminance distribution. However, in this embodiment, since the laser beam diffused by the transmission/diffusion plate 33 is incident on the light tunnel 34, the light tunnel 34 can effectively uniformize the illuminance distribution. Therefore, the length of the light tunnel 34 in the optical axis direction is reduced and it is possible to reduce the size of the pattern irradiation device 20.

The image forming unit 35 is provided immediately after the light tunnel 34 without passing through, for example, a relay optical system. Therefore, in the pattern irradiation device 20, the optical distance between the light tunnel 34 and the image forming unit 35 is reduced and it is possible to prevent diffused light emitted from the light tunnel 34 from leaking to the outside. As a result, in the pattern irradiation device 20, it is possible to increase the transmission efficiency of light and to increase output energy.

In this embodiment, the laser diode 41 emits a blue laser beam. Therefore, the pattern irradiation device 20 can measure the distance with high accuracy and provide a good working environment to the operator. The reason is as follows.

For example, a projector light source P1W manufactured by Osram GmbH has been known (http://www.osram.jp/osram_jp/press/press-releases/_trade_press/2013/osram-led-power-packs-for-projectors/). The light source P1W emits blue light with a brightness of 500 lm, red light with a brightness of 1250 lm, and green light with a brightness of 4150 lm. Here, lm is a unit of luminous flux and indicates brightness considering visibility. When visibility is not considered, a radiant flux (unit W) of light is calculated as follows: luminous flux (lm)=683×radiant flux (W)×Y-stimulus value. When a conversion factor lm/W is calculated from the representative spectrum of each color, the conversion factor of blue is 40 lm/W, the conversion factor of red is 200 lm/W, and the conversion factor of green is 480 lm/W. Therefore, the radiant flux of blue is 12.5 W, the radiant flux of red is 6.3 W, and the radiant flux of green is 8.6 W, on the basis of the luminous flux and the conversion factor. That is, blue has the highest radiant flux.

Preferably, the pattern irradiation device 20 that emits the image pattern for measuring the distance includes a light source that does not have the amount of luminous flux considering the sensitivity of the human eye, that is, visibility, but has a high radiant flux which is the real output of light. As described above, the blue laser diode has the highest radiant flux among commercially available light sources. Since the laser diode 41 emits a blue laser beam, the pattern irradiation device 20 can illuminate the target 11 with high energy and can measure the distance with high accuracy even if the target 11 is, for example, black.

Blue light has a low luminous flux and does not dazzle the human eyes. Since the laser diode 41 emits a blue laser beam, the operator is likely to see the target 11 and the pattern irradiation device 20 can provide a good working environment. In addition, blue light is visible light. Since the laser diode 41 emits a blue laser beam, the pattern irradiation device 20 enables the operator to see an illumination area and can provide an environment in which the operator easily adjusts the illumination area.

The polarization direction of the laser beams emitted from the plurality of laser diodes 41 in the light emitting unit 31 is adjusted such that the laser beams become the first polarized light. Therefore, light emitted from the pattern irradiation device 20 becomes the first polarized light. The three-dimensional measurement device 21 includes the selective transmission unit 24 (for example, a polarizing filter) that blocks the first polarized light. The selective transmission unit 24 is, for example, a polarizing filter and the rotation of the selective transmission unit 24 about the optical axis can be adjusted. The selective transmission unit 24 is adjusted so as to block the first polarized light. Therefore, the three-dimensional measurement device 21 can prevent a reduction in the accuracy of recognition due to the influence of light directly reflected from the target 11. In addition, the selective transmission unit 24 may not be rotated with respect to the pattern irradiation device 20, but the pattern irradiation device 20 may be rotated and adjusted such that the selective transmission unit 24 blocks the first polarized light.

The pattern irradiation device 20 may include a light source which is a combination of, for example, an LED that emits non-polarized light and a polarizing filter and may emit the first polarized light. However, the polarizing filter blocks polarized light (or polarized light that rotates in a reverse direction) perpendicular to the direction of polarized light that is transmitted. Therefore, the amount of light emitted from the light source, which is a combination of, for example, an LED that emits non-polarized light and a polarizing filter, is equal to or less than half of the amount of light in this embodiment. As a result, the efficiency of the light source is reduced. In contrast, in this embodiment, the light emitting unit 31 of the pattern irradiation device 20 includes a plurality of laser diodes 41 and the polarization direction of the laser beam emitted from the light emitting unit 31 is adjusted such that the laser beam becomes the first polarized light. Therefore, it is not necessary to block light and it is possible to effectively illuminate a target with polarized light.

As described above, according to the pattern irradiation device 20 of this embodiment, it is possible to obtain polarized light with high optical power and to reduce a size and costs. In addition, the pattern irradiation device 20 can provide a good working environment to the operator.

In the related art, for example, pattern irradiation is performed by a projection device (projector) using a digital mirror device (DMD) or a liquid crystal panel. However, an optical system of the projection device using, for example, the DMD or the liquid crystal panel has a large number of components since it includes a relay optical system and an optical system for combining colors. Therefore, a device that performs pattern irradiation using the projection device has a large size and high costs. In this embodiment, the pattern irradiation device 20 can perform pattern irradiation, without using the projection device according to the related art.

The pattern irradiation device 20 (illumination device) according to this embodiment is applied to the system that three-dimensionally measures the target 11. However, the pattern irradiation device 20 may be applied to a system that performs processes other than the three-dimensional measurement. In this case, the system includes the pattern irradiation device 20 (illumination device) that irradiates the target 11 with the first polarized light, an imaging device that captures an image of the target 11, and the selective transmission unit 24 that is provided on an optical path from the target 11 to an imaging element (for example, a CCD) of the imaging device. The imaging device captures an image of the target 11, using, for example, a single camera, and performs image processing such as a process of detecting the edge of the target 11. This system can also perform a process of improving the accuracy of recognition of the target 11 of which the image is captured by the imaging device.

Second Embodiment

Next, a pattern irradiation device 50 according to a second embodiment will be described. Instead of the pattern irradiation device 20 according to the first embodiment, the pattern irradiation device 50 according to the second embodiment is applied to the handling system 10, which holds for the third and subsequent embodiments.

The pattern irradiation device 50 according to the second embodiment has substantially the same function and structure as the pattern irradiation device 20 according to the first embodiment. Members having substantially the same function and structure as in the first embodiment are denoted by the same numerals and the detailed description thereof will not be repeated. Only the difference between the first embodiment and the second embodiment will be described.

FIG. 6 is a diagram illustrating the structure of the pattern irradiation device 50 according to the second embodiment. The pattern irradiation device 50 includes a light emitting unit 31, a condensing unit 32, a reflecting/diffusion plate 51, a light tunnel 34, an image forming unit 35, and an irradiation optical system 36. The pattern irradiation device 50 differs from the pattern irradiation device according to the first embodiment in that it includes the reflecting/diffusion plate 51 as a diffusion unit, instead of the transmission/diffusion plate 33.

The condensing unit 32 focuses the first polarized light emitted from the light emitting unit 31 on the reflecting/diffusion plate 51. In this embodiment, the condensing unit 32 focuses a plurality of laser beams substantially on one point of the reflecting/diffusion plate 51.

The reflecting/diffusion plate 51 is a diffusion unit that diffuses incident light. The reflecting/diffusion plate 51 receives a plurality of laser beams focused by the condensing unit 32 and reflects the incident light to the light tunnel 34 while diffusing the incident light. The reflecting/diffusion plate 51 differs from the transmission/diffusion plate 33 in that it reflects and diffuses light and is the same as the transmission/diffusion plate 33 in the other functions and effects.

The light tunnel 34 receives the light that has been diffused by the reflecting/diffusion plate 51, uniformizes an illuminance distribution of the light, and emits the light.

FIG. 7 is a diagram illustrating an example of an optical path in the reflecting/diffusion plate 51. The reflecting/diffusion plate 51 has a substantially flat plate shape as a whole and includes a transmission/diffusion surface 52 closer to the condensing unit 32 and a reflecting surface 53 opposite to the condensing unit 32.

Fine uneven portions are randomly formed on the transmission/diffusion surface 52. The transmission/diffusion surface 52 transmits light and diffuses the transmitted light. An anti-reflection film may be formed on the transmission/diffusion surface 52. In this case, the transmission/diffusion surface 52 can increase transmittance.

The reflecting surface 53 reflects the light that has been emitted from the condensing unit 32 and has passed through the transmission/diffusion surface 52. The reflecting surface 53 is, for example, a plane and does not diffuse light. A reflective coating film, such as a dielectric multi-layer film or a metal film, may be formed on the reflecting surface 53.

In this case, the reflecting surface 53 can increase reflectivity. Light that is reflected from the reflecting surface 53 is transmitted through the transmission/diffusion surface 52 again and is then incident on the light tunnel 34.

As illustrated in FIG. 7, it is assumed that a beam a emitted from the condensing unit 32 is incident on the reflecting/diffusion plate 51. In this case, the beam a is incident on the transmission/diffusion surface 52. Then, the beam a is transmitted and diffused by the transmission/diffusion surface 52 and becomes diffused beams a1 and a2. Here, only the diffused beams a1 and a2 are illustrated. However, there are a large number of diffused beams of the beam a.

Then, the diffused beams a1 and a2 are reflected from the reflecting surface 53 and are incident on the rear side of the transmission/diffusion surface 52 again. Then, the diffused beams a1 and a2 are transmitted and diffused by the transmission/diffusion surface 52 and become diffused beams a11, a12, a21, and a22. Here, only the diffused beams a11, a12, a21, and a22 are illustrated. However, there are a large number of diffused beams of the beams a1 and a2.

As such, in the reflecting/diffusion plate 51 having the above-mentioned structure, light is diffused two times by the transmission/diffusion surface 52. Therefore, the reflecting/diffusion plate 51 can improve a diffusion effect and can emit light with a uniform illuminance distribution. According to the pattern irradiation device 50 of this embodiment, it is possible to irradiate the target 11 with image pattern with a uniform illuminance distribution.

In this embodiment, a surface of the reflecting/diffusion plate 51 which is close to the condensing unit 32 is the transmission/diffusion surface 52. However, instead of this structure, a surface of the reflecting/diffusion plate 51 which is close to the condensing unit 32 may be a reflecting/diffusion surface that diffuses and reflects light.

As described above, since the pattern irradiation device 50 according to this embodiment includes the reflecting/diffusion plate 51, it is possible to emit light with a uniform illuminance distribution.

FIG. 8 is a diagram illustrating an example of an optical path when the reflecting/diffusion plate 51 is detached. It is assumed that, in the pattern irradiation device 50 according to this embodiment, the reflecting/diffusion plate 51 is detached or damaged due to, for example, a failure and a laser beam is not reflected from the reflecting/diffusion plate 51. In this case, as illustrated in FIG. 8, laser beams which are emitted from the light emitting unit 31 are not incident on the light tunnel 34. Therefore, in this case, the pattern irradiation device 50 does not emit any light to the projection surface 30.

For example, in the pattern irradiation device 50, when the reflecting/diffusion plate 51 is detached or damaged, a laser beam is not diffused and directly emitted to the outside. Therefore, the pattern irradiation device 50 makes it possible to achieve a mechanism, which prevents a laser beam from being emitted to the outside when a diffusion unit is detached or damaged, with a simple structure.

Third Embodiment

Next, a pattern irradiation device 60 according to a third embodiment will be described. The pattern irradiation device 60 according to the third embodiment has substantially the same function and structure as the pattern irradiation device 50 according to the second embodiment. Members having substantially the same function and structure as in the second embodiment are denoted by the same reference numerals and the detailed description thereof will not be repeated. Only the difference between the third embodiment and the second embodiment will be described.

FIG. 9 is a diagram illustrating the structure of the pattern irradiation device 60 according to the third embodiment. The pattern irradiation device 60 includes a light emitting unit 31, a condensing unit 32, a reflecting/diffusion plate 51, a tapered light tunnel 61, an image forming unit 35, and an irradiation optical system 36. The pattern irradiation device 60 differs from the pattern irradiation device according to the second embodiment in that it includes the tapered light tunnel 61 as a uniformization optical system, instead of the light tunnel 34.

The tapered light tunnel 61 receives light that is diffused by the reflecting/diffusion plate 51, uniformizes an illuminance distribution of the light, and emits the light. The tapered light tunnel 61 has substantially the same structure and function as the light tunnel 34 except for a shape.

FIG. 10 is a diagram illustrating an example of an optical path in the tapered light tunnel 61. As illustrated in FIG. 10, the tapered light tunnel 61 differs from the light tunnel 34 in that an outlet 65 is larger than an inlet 64 and a reflecting side surface 62 is inclined with respect to the optical axis of an optical path 63. In addition, in the tapered light tunnel 61, the shape of a plane (including the shapes of the inlet 64 and the outlet 65) in a direction perpendicular to the optical axis in the optical path 63 is a rectangle having substantially the same aspect ratio as the image forming unit 35.

Similarly to the light tunnel 34, light that is incident on the tapered light tunnel 61 passes through the inside of the optical path 63 while being reflected from the reflecting side surface 62. Therefore, the tapered light tunnel 61 can uniformize the illuminance distribution of light that is emitted.

Here, in the tapered light tunnel 61, the reflecting side surface 62 perpendicular to the z direction is inclined in the z direction at an angle θt with respect to the optical axis. Therefore, in the tapered light tunnel 61, the incident angle θc of light can be less than the emission angle θd of light. The tapered light tunnel 61 can reduce the incident angle (diffusion angle) of light on the image forming unit 35 which is provided in the subsequent stage.

Since the pattern irradiation device 60 includes the tapered light tunnel 61, it is possible to reduce the incident angle of a beam, which has been transmitted through the image forming unit 35, on the irradiation optical system 36, that is, to reduce NA. Therefore, the pattern irradiation device 60 can improve the incidence efficiency of light on the irradiation optical system 36 and can obtain high optical power.

The tapered light tunnel 61 can reduce the emission angle θd of light as the inclination angle θt of the reflecting side surface 62 increases. The size of the inlet 64 may decrease or the size of the outlet 65 may increase in order to increase the inclination angle θt. However, when the size of the inlet 64 decreases, it is difficult to effectively capture light reflected from the reflecting/diffusion plate 51. When the size of the outlet 65 increases, light that illuminates outside the image forming unit 35 is wasted. Therefore, it is preferable to appropriately set the inclination angle θt, the size of the inlet 64, and the size of the outlet 65, considering the above.

When the length of the tapered light tunnel 61 in the optical axis direction increases in a state in which the sizes of the inlet 64 and the outlet 65 are fixed, the number of times light is reflected increases and it is possible to further uniformize the illuminance distribution of light. However, when the length of the tapered light tunnel 61 in the optical axis direction increases, efficiency is reduced due to an increase in the number of times light is reflected. In addition, the inclination angle θt is reduced and the acquisition efficiency of the irradiation optical system 36 is reduced. Therefore, it is preferable to appropriately set the length of the tapered light tunnel 61 in the optical axis direction, considering the above.

As described above, since the pattern irradiation device 60 according to this embodiment includes the tapered light tunnel 61, it is possible to obtain high output power.

Fourth Embodiment

Next, a pattern irradiation device 70 according to a fourth embodiment will be described. The pattern irradiation device 70 according to the fourth embodiment has substantially the same function and structure as the pattern irradiation device 60 according to the third embodiment. Members having substantially the same function and structure as in the third embodiment are denoted by the same reference numerals and the detailed description thereof will not be repeated. Only the difference between the fourth embodiment and the third embodiment will be described.

FIG. 11 is a diagram illustrating the structure of the pattern irradiation device 70 according to the fourth embodiment. The pattern irradiation device 70 includes a light emitting unit 31, a condensing unit 32, a reflecting/diffusion plate 51, a tapered light tunnel 61, an image forming unit 35, a prism 71, and an irradiation optical system 36. The condensing unit 32 includes a first mirror group 72 and a lens 73.

The pattern irradiation device 70 differs from the pattern irradiation device according to the third embodiment in that it further includes the prism 71. In addition, the pattern irradiation device 70 differs from the pattern irradiation device according to the third embodiment in that the condensing unit 32 includes the first mirror group 72 and the lens 73.

The first mirror group 72 reflects a plurality of parallel beams, which have been emitted in the same direction from the light emitting unit 31, to the lens 73. The first mirror group 72 includes a plurality of mirrors 74. Each mirror 74 reflects laser beams, which have been emitted from laser diodes 41 and then changed to parallel beams by collimator lenses 42, to the lens 73. The plurality of mirrors 74 reflect the plurality of parallel beams in the same direction. That is, the plurality of mirrors 74 reflect the plurality of parallel beams in parallel.

The lens 73 focuses the plurality of parallel beams, which are incident thereon in parallel, substantially on one point of the reflecting/diffusion plate 51.

The prism 71 is inserted between the image forming unit 35 and the irradiation optical system 36. In this embodiment, the irradiation optical system 36 is provided such that the optical axis of incident light is perpendicular to the optical axis of the tapered light tunnel 61. The prism 71 reflects light emitted from the image forming unit 35 so as to be incident on the irradiation optical system 36. Since the pattern irradiation device 70 includes the prism 71, it is possible to dispose each component in a small space. The pattern irradiation device 70 may include a mirror, instead of the prism 71.

When the prism 71 is inserted between the tapered light tunnel 61 and the image forming unit 35, the distance between the tapered light tunnel 61 and the image forming unit 35 increases, which results in an increase in light loss. For example, a lens may be used to focus light. In this case, the number of components increases. Therefore, according to the pattern irradiation device 70 of the fourth embodiment, since the prism 71 is provided between the image forming unit 35 and the irradiation optical system 36, it is possible to reduce the space in which the components are arranged, without reducing efficiency.

FIG. 12 is a diagram illustrating an example of the arrangement of, for example, the first mirror group 72 and the lens 73 according to the fourth embodiment. In this embodiment, the light emitting unit 31 includes eight laser diodes 41 and eight collimator lenses 42 which are arranged in a 2×4 matrix.

In this embodiment, the first mirror group 72 includes four mirrors 74. Each of the four mirrors 74 is provided so as to correspond to two laser diodes 41 and two collimator lenses 42 which are arranged in the y direction. Each mirror 74 reflects two parallel beams emitted from two corresponding collimator lenses 42.

The first mirror group 72 may include eight mirrors 74. In this case, each mirror 74 reflects a parallel beam emitted from any one of the collimator lenses 42.

FIG. 13A is a diagram illustrating an optical path when a single-plate mirror 75 is used and FIG. 13B is a diagram illustrating an optical path when the first mirror group 72 is used.

It is assumed that the pattern irradiation device 70 includes the single-plate mirror 75 illustrated in FIG. 13A, instead of the first mirror group 72. The single-plate mirror 75 is disposed so as to be inclined at an angle of 45° with respect to a plurality of parallel beams emitted from the light emitting unit 31. Therefore, the single-plate mirror 75 can reflect the parallel beams emitted from the light emitting unit 31 at 90°.

Here, it is assumed that a beam width which is formed by a plurality of parallel beams emitted from the light emitting unit 31 is L1. It is assumed that a beam width formed by a plurality of parallel beams which are incident on the lens 73 from the single-plate mirror 75 is L2. L1 and L2 are equal in length to each other.

In contrast, as illustrated in FIG. 13B, each of the mirrors 74 forming the first mirror group 72 is disposed so as to be inclined at an angle of 45° with respect to a plurality of parallel beams emitted from the light emitting unit 31. Therefore, each mirror 74 can reflect the parallel beams emitted from the light emitting unit 31 at 90°.

Then, the plurality of mirrors 74 reflect a plurality of parallel beams emitted from the light emitting unit 31 to the lens 73 such that a beam width formed by the plurality of parallel beams which are emitted in the same direction from the light emitting unit 31 is reduced. Therefore, when a beam width formed by a plurality of parallel beams which are incident on the lens 73 from the plurality of minors 74 is L3, L3 is less than L1.

As such, the first mirror group 72 reduces the width of the beams which are incident on the lens 73. Therefore, it is possible to reduce the size of the lens 73 in the pattern irradiation device 70. In addition, since the width of the beams which are incident on the lens 73 is small, the incident angle of light which is focused on the reflecting/diffusion plate 51 is reduced in the pattern irradiation device 70, which makes it possible to reduce the diffusion angle of a beam emitted from the tapered light tunnel 61. Therefore, in the pattern irradiation device 70, the NA of the irradiation optical system 36 is reduced and it is possible to increase the incidence efficiency of light on the irradiation optical system 36.

As described above, according to the pattern irradiation device 70 of this embodiment, since the optical axis is bent by the prism 71 and the first mirror group 72, it is possible to reduce the space in which components are arranged. In addition, since the beam width is reduced, it is possible to obtain high output power.

Fifth Embodiment

Next, a pattern irradiation device 80 according to a fifth embodiment will be described. The pattern irradiation device 80 according to the fifth embodiment has substantially the same function and structure as the pattern irradiation device 70 according to the fourth embodiment. Members having substantially the same function and structure as in the fourth embodiment are denoted by the same reference numerals and the detailed description thereof will not be repeated. Only the difference between the fifth embodiment and the fourth embodiment will be described.

FIG. 14 is a diagram illustrating the structure of the pattern irradiation device 80 according to the fifth embodiment. A condensing unit 32 according to the fifth embodiment includes a second mirror group 81 and a cylindrical lens 82. The pattern irradiation device 80 differs from the pattern irradiation device 70 according to the fourth embodiment in that the condensing unit 32 includes the second mirror group 81 and the cylindrical lens 82.

The second mirror group 81 reflects a plurality of parallel beams, which have been emitted in the same direction from the light emitting unit 31, to a reflecting/diffusion plate 51. The second mirror group 81 includes a plurality of mirrors 83. Each mirror 83 reflects laser beams, which have been emitted from laser diodes 41 and then changed to parallel beams by collimator lenses 42, to the reflecting/diffusion plate 51.

In this case, the plurality of mirrors 83 focus a plurality of parallel beams in a first direction that is perpendicular to the optical axis, using a reflection angle. In this embodiment, the reflection angles of the plurality of mirrors 83 are set such that x-direction components of a plurality of parallel beams are emitted substantially to one point of the reflecting/diffusion plate 51. Therefore, the mirrors 83 forming the second mirror group 81 have different reflection angles in the first direction.

The cylindrical lens 82 is provided between the second mirror group 81 and the reflecting/diffusion plate 51. The cylindrical lens 82 focuses a plurality of parallel beams which travel from the second mirror group 81 to the reflecting/diffusion plate 51 in a second direction that is perpendicular to the optical axis and is perpendicular to the first direction.

FIG. 15 is a diagram illustrating an example of the arrangement of, for example, the second mirror group 81 and the cylindrical lens 82 according to the fifth embodiment. In this embodiment, the light emitting unit 31 includes eight laser diodes 41 and eight collimator lenses 42 which are arranged in a 2×4 matrix.

In this embodiment, the second mirror group 81 includes four mirrors 83. Each of the four mirrors 83 is provided so as to correspond to two laser diodes 41 and two collimator lenses 42 which are arranged in the y direction. Each mirror 83 reflects two parallel beams emitted from two corresponding collimator lenses 42.

The second mirror group 81 may include eight mirrors 83. In this case, each mirror 83 reflects a parallel beam emitted from any one of the collimator lenses 42.

Then, the cylindrical lens 82 focuses a plurality of parallel beams which travel from the second mirror group 81 to the reflecting/diffusion plate 51 in the second direction that is perpendicular to the optical axis and is perpendicular to the first direction. In this embodiment, the cylindrical lens 82 focuses the plurality of parallel beams such that y-direction components of the plurality of parallel beams are emitted substantially to one point of the reflecting/diffusion plate 51.

As such, since the pattern irradiation device 80 focuses light in the first direction (for example, the x direction) using the reflection angle of the mirror 83, a focusing operation using a lens is not used. Therefore, in the pattern irradiation device 80, the width of beams incident on the cylindrical lens 82 is relatively small and it is possible to reduce the diameter of the cylindrical lens 82. In addition, in the pattern irradiation device 80, since the diameter of the cylindrical lens 82 can be reduced, it is possible to reduce the curvature radius of the cylindrical lens 82 while ensuring an edge thickness that can be manufactured. Therefore, in the pattern irradiation device 80, it is possible to reduce the distance from the cylindrical lens 82 to the reflecting/diffusion plate 51. As a result, it is possible to reduce the size of the device.

The pattern irradiation device 80 may include a toroidal lens having a different curvature radius in the first direction (for example, the x direction) and the second direction (for example, the y direction), instead of the cylindrical lens 82. In this case, the reflection angle of the second minor group 81 is set such that first-direction components of a plurality of parallel beams are emitted substantially to one point of the reflecting/diffusion plate 51, in addition to the focusing function of the toroidal lens in the first direction.

Sixth Embodiment

Next, a pattern irradiation device 90 according to a sixth embodiment will be described. The pattern irradiation device 90 according to the sixth embodiment has substantially the same function and structure as the pattern irradiation device 70 according to the fourth embodiment. Members having substantially the same function and structure as in the fifth embodiment are denoted by the same reference numerals and the detailed description thereof will not be repeated. Only the difference between the sixth embodiment and the fifth embodiment will be described.

FIG. 16 is a diagram illustrating the structure of the pattern irradiation device 90 according to the sixth embodiment. A condensing unit 32 according to the sixth embodiment includes a third minor group 91. The pattern irradiation device 90 differs from the pattern irradiation device 70 according to the fourth embodiment in that the condensing unit 32 includes the third mirror group 91.

The third minor group 91 reflects a plurality of parallel beams, which have been emitted in the same direction from a light emitting unit 31, to a reflecting/diffusion plate 51. The third minor group 91 includes a plurality of mirrors 93. Each mirror 93 reflects laser beams, which have been emitted from laser diodes 41 and then changed to parallel beams by collimator lenses 42, to the reflecting/diffusion plate 51.

In this case, the plurality of mirrors 93 focus a plurality of parallel beams, using a reflection angle. In this embodiment, the reflection angles of the plurality of mirrors 93 are set such that a plurality of parallel beams are emitted substantially to one point of the reflecting/diffusion plate 51. Therefore, the mirrors 93 forming the third minor group 91 have different reflection angles.

FIG. 17 is a diagram illustrating an example of the arrangement of, for example, the third mirror group 91 according to the sixth embodiment. In this embodiment, the light emitting unit 31 includes eight laser diodes 41 and eight collimator lenses 42 which are arranged in a 2×4 matrix.

In this embodiment, the third mirror group 91 includes eight mirrors 93. Each of the eight mirrors 93 is provided so as to correspond to any one of the laser diodes 41 and any one of the collimator lenses 42. Each mirror 93 reflects one parallel beam emitted from one corresponding collimator lenses 42. The reflection angle of each mirror 93 is adjusted such that the reflected parallel beam is focused substantially on one point of the reflecting/diffusion plate 51.

As such, in the pattern irradiation device 90, beams are focused on the reflecting/diffusion plate 51 by the third minor group 91. Therefore, the pattern irradiation device 90 may not include a lens for focusing beams on the reflecting/diffusion plate 51. In this case, the structure of the pattern irradiation device 90 is simplified. When beams are focused by a lens, the distance from the lens to the reflecting/diffusion plate 51 is limited by the lower limit of the focal length. However, in the pattern irradiation device 90, the inclination of the mirrors 93 forming the third mirror group 91 may be adjusted. Therefore, there is no distance limitation and it is possible to reduce the space in which components are arranged.

Seventh Embodiment

Next, a pattern irradiation device 110 according to a seventh embodiment will be described. The pattern irradiation device 110 according to the seventh embodiment has substantially the same function and structure as the pattern irradiation device 70 according to the fourth embodiment. Members having substantially the same function and structure as in the fourth embodiment are denoted by the same reference numerals and the detailed description thereof will not be repeated. Only the difference between the seventh embodiment and the fourth embodiment will be described.

FIG. 18 is a diagram illustrating the structure of the pattern irradiation device 110 according to the seventh embodiment. The pattern irradiation device 110 includes a light emitting unit 31, a condensing unit 32, a reflecting/diffusion plate 51, a tapered light tunnel 61, an image forming unit 35, a prism 71, an irradiation optical system 36, a polarizing filter 111, and an attachment/detachment mechanism 112. The pattern irradiation device 110 differs from the pattern irradiation device 70 according to the fourth embodiment in that it includes the polarizing filter 111 and the attachment/detachment mechanism 112.

The polarizing filter 111 transmits the first polarized light and blocks light components other than the first polarized light. For example, when the first polarized light is linearly polarized light, the polarizing filter 111 transmits the first polarized light and blocks second polarized light perpendicular to the first polarized light. When the first polarized light is circularly polarized light, the polarizing filter 111 transmits the first polarized light and blocks the second polarized light that rotates in a direction opposite to the first polarized light.

In this embodiment, the polarizing filter 111 is provided behind the irradiation optical system 36. The position of the polarizing filter 111 is not limited thereto and the polarizing filter 111 may be provided at any position on the optical path from the light emitting unit 31 to the irradiation optical system 36.

When light emitted from the light emitting unit 31 includes components other than the first polarized light or when components other than the first polarized light are generated due to a little disorder of polarized light at any position on the optical path from the light emitting unit 31 to the polarizing filter 111, the polarizing filter 111 can block the components other than the first polarized light. The amount of light blocked by the polarizing filter 111 is relatively small.

The attachment/detachment mechanism 112 is operated by, for example, the operator such that the polarizing filter 111 is inserted into the optical path or the polarizing filter 111 is separated from the optical path. For example, when light is emitted to a target 11 with a textured and matt surface, the attachment/detachment mechanism 112 is operated by, for example, the operator to separate the polarizing filter 111 from the optical path. For example, when light is emitted to a target 11 with a glossy surface, the attachment/detachment mechanism 112 is operated by, for example, the operator to insert the polarizing filter 111 into the optical path.

The polarizing filter 111 may have a mechanism of fixing the direction of polarized light that is transmitted therethrough to the direction of the first polarized light. For example, the polarizing filter 111 has a structure such as a claw or a groove for fixing a transmission direction to the direction of the first polarized light. In this way, the polarizing filter 111 can reliably transmit the first polarized light.

A selective transmission unit 24 of a three-dimensional measurement device 21 may have a mechanism that fixes the direction of polarized light to be blocked to the direction of the first polarized light. That is, the selective transmission unit 24 may have a mechanism that transmits light polarized in a direction perpendicular to the polarizing filter 111. For example, the polarizing filter 111 has a structure such as a claw or a groove for fixing the blocking direction to the direction of the first polarized light. Therefore, the polarizing filter 111 can reliably block the first polarized light.

A mechanism that makes the direction in which polarized light is transmitted through the polarizing filter 111 of the pattern irradiation device 110 reliably equal to or opposite to the direction in which polarized light is transmitted through the selective transmission unit 24 of the three-dimensional measurement device 21 may be provided in each of the polarizing filter 111 and the selective transmission unit 24. In this case, it is possible to prevent the first polarized light emitted from the pattern irradiation device 110 from being directly incident on the three-dimensional measurement device 21 or from being directly reflected and incident on the three-dimensional measurement device 21.

As such, the pattern irradiation device 110 can reliably emit the first polarized light. The structure unique to the seventh embodiment may be applied to the embodiments other than the fourth embodiment.

Eighth Embodiment

Next, a pattern irradiation device 120 according to an eighth embodiment will be described. The pattern irradiation device 120 according to the eighth embodiment has substantially the same function and structure as the pattern irradiation device 70 according to the fourth embodiment. Members having substantially the same function and structure as in the fourth embodiment are denoted by the same reference numerals and the detailed description thereof will not be repeated. Only the difference between the eighth embodiment and the fourth embodiment will be described.

FIG. 19 is a diagram illustrating the structure of the pattern irradiation device 120 according to the eighth embodiment. The pattern irradiation device 120 includes a light emitting unit 31, a condensing unit 32, a reflecting/diffusion plate 51, a tapered light tunnel 61, an image forming unit 35, an additional light emitting unit 121, an additional condensing unit 122, an additional reflecting/diffusion plate 123 (additional diffusion unit), an additional tapered light tunnel 124 (additional uniformization optical system), an additional image forming unit 125, a composition optical system 126, an irradiation optical system 36, and a control unit 130.

The pattern irradiation device 120 differs from the pattern irradiation device 70 according to the fourth embodiment in that it includes the additional light emitting unit 121, the additional condensing unit 122, the additional reflecting/diffusion plate 123, the additional tapered light tunnel 124, the additional image forming unit 125, the composition optical system 126, and the control unit 130.

The additional light emitting unit 121 emits second polarized light different from the first polarized light. When the first polarized light is linearly polarized light, the second polarized light is polarized light perpendicular to the first polarized light. When the first polarized light is circularly polarized light, the second polarized light is circularly polarized light that rotates in a direction opposite to the first polarized light. In this embodiment, the additional light emitting unit 121 emits laser beams, which are a plurality of parallel beams aligned with second predetermined polarized light, in the same direction.

The additional light emitting unit 121 has the same structure as the light emitting unit 31 except for the direction of polarized light. In this embodiment, the additional light emitting unit 121 includes a plurality of laser diodes 41 which are light sources emitting the second polarized light and a plurality of collimator lenses 42.

The additional condensing unit 122 focuses light emitted from the additional light emitting unit 121 on the additional reflecting/diffusion plate 123. In this embodiment, the additional condensing unit 122 is a lens and focuses a plurality of laser beams substantially on one point of the additional reflecting/diffusion plate 123. In addition, the additional condensing unit 122 may have the structures illustrated in FIGS. 11 to 17.

The additional reflecting/diffusion plate 123 is a diffusion unit that diffuses incident light. The additional reflecting/diffusion plate 123 has the same structure as the reflecting/diffusion plate 51. In addition, the pattern irradiation device 120 may include an additional transmission/diffusion plate having the same structure as the transmission/diffusion plate 33, instead of the additional reflecting/diffusion plate 123.

The light diffused by the additional reflecting/diffusion plate 123 is incident on the additional tapered light tunnel 124. The additional tapered light tunnel 124 uniformizes the illuminance distribution of the light and emits the light. The additional tapered light tunnel 124 has the same structure as the tapered light tunnel 61. In addition, the pattern irradiation device 120 may include a uniformization optical system having the same structure as the light tunnel 34, instead of the tapered light tunnel 61.

The additional image forming unit 125 transmits and blocks (or reflects) the light emitted from the additional tapered light tunnel 124 according to a predetermined image pattern and forms an image with a predetermined image pattern on a plane that is perpendicular to the optical axis. The additional image forming unit 125 has the same structure as the image forming unit 35.

The composition optical system 126 combines the first polarized light emitted from the image forming unit 35 and the second polarized light emitted from the additional image forming unit 125 on the same optical axis and inputs the combined light to the irradiation optical system 36. For example, the composition optical system 126 is a polarization beam splitter. In this embodiment, the composition optical system 126 reflects the first polarized light emitted from the image forming unit 35 and transmits the second polarized light emitted from the additional image forming unit 125, thereby combining the first polarized light and the second polarized light. In addition, the composition optical system 126 may transmit the first polarized light emitted from the image forming unit 35 and reflect the second polarized light emitted from the additional image forming unit 125, thereby combining the first polarized light and the second polarized light.

The polarization beam splitter may be a cube type or a plate type. When the polarization beam splitter is a plate type, it is possible to reduce the weight of the device and to reduce costs.

The control unit 130 switches among a mode in which the control unit 130 directs the light emitting unit 31 to emit the first polarized light, a mode a mode in which the control unit 130 directs the additional light emitting unit 121 to emit the second polarized light, and a mode in which the control unit 130 directs both the light emitting unit 31 and the additional light emitting unit 121 to emit light.

When the first polarized light is emitted from the light emitting unit 31, the pattern irradiation device 120 can irradiate the target 11 with the first polarized light. When the second polarized light is emitted from the light emitting unit 31, the pattern irradiation device 120 can irradiate the target 11 with the second polarized light. When light is emitted from both the light emitting unit 31 and the additional light emitting unit 121, the pattern irradiation device 120 can irradiate the target 11 with the first polarized light and the second polarized light.

When the pattern irradiation device 120 is applied, the selective transmission unit 24 of the three-dimensional measurement device 21 switches among a mode in which the selective transmission unit 24 blocks the first polarized light, a mode in which the selective transmission unit 24 blocks the second polarized light, and a mode in which the selective transmission unit 24 transmits all of the polarized light components (for blocking neither the first polarized light nor the second polarized light) in synchronization with the control of the control unit 130. For example, the selective transmission unit 24 includes a first polarizing filter that blocks the first polarized light and transmits polarized light (second polarized light) other than the first polarized light and a second polarizing filter that blocks the second polarized light and transmits polarized light (first polarized light) other than the second polarized light. The selective transmission unit 24 switches between a mode in which the first polarizing filter is used and a mode in which the second polarizing filter is used, according to the polarized light emitted from the pattern irradiation device 120.

Specifically, when the control unit 130 performs control such that the first polarized light is emitted, the selective transmission unit 24 switches to the mode in which the selective transmission unit 24 blocks the first polarized light. When the control unit 130 performs control such that the second polarized light is emitted, the selective transmission unit 24 switches to the mode in which the selective transmission unit 24 blocks the second polarized light. When the control unit 130 performs control such that both the first polarized light and the second polarized light are emitted, the selective transmission unit 24 switches to the mode in which the selective transmission unit 24 transmits all of the polarized light components.

The pattern irradiation device 120 according to the eighth embodiment can irradiate the target 11 with the first polarized light, the second polarized light, or light obtained by combining the first polarized light and the second polarized light, while switching the polarized light components.

FIG. 20 is a diagram illustrating an example of a method for switching irradiation light in the pattern irradiation device 120 according to the eighth embodiment.

The control unit 130 switches among a mode in which the control unit 130 turns on the light emitting unit 31 to irradiate the target 11 with the first polarized light, a mode in which the control unit 130 turns on the additional light emitting unit 121 to irradiate the target 11 with the second polarized light, and a mode in which the control unit 130 turns on both the light emitting unit 31 and the additional light emitting unit 121 to irradiate the target 11 with both the first polarized light and the second polarized light, according to, for example, time. For example, the control unit 130 may switch the modes according to, for example, the state of the surface of the target 11.

Specifically, when a target 11 with a high-gloss and smooth surface is recognized, the control unit 130 turns on the light emitting unit 31 or the additional light emitting unit 121 to irradiate the target 11 with the first polarized light or the second polarized light. The selective transmission unit 24 of the three-dimensional measurement device 21 blocks the first polarized light when the light emitting unit 31 is turned on and blocks the second polarized light when the additional light emitting unit 121 is turned on. In this way, the three-dimensional measurement device 21 can prevent a reduction in the accuracy of recognition due to gloss.

When a target 11 with a textured and matt surface is recognized, the control unit 130 turns on both the light emitting unit 31 and the additional light emitting unit 121 to irradiate the target 11 with both the first polarized light and the second polarized light. The selective transmission unit 24 of the three-dimensional measurement device 21 transmits the polarized light components, without blocking any polarized light. In this way, the three-dimensional measurement device 21 can increase the amount of light reflected from a target 11 with low reflectivity and improve the accuracy of recognition.

The pattern irradiation device 120 may irradiate different patterns using the image forming unit 35 and the additional image forming unit 125. In this case, the pattern irradiation device 120 can easily switch the patterns emitted to the target 11. In addition, the pattern irradiation device 120 may not include the image forming unit 35 or the additional image forming unit 125. In this case, the pattern irradiation device 120 can switch between a mode in which the first polarized light is emitted and a mode in which the second polarized light is emitted in a recognition process which needs to irradiate the target 11 with pattern light and a recognition process which does not need to irradiate the target 11 with pattern light, such as an edge detection process.

The pattern irradiation device 120 may include a common image forming unit 35 that is provided behind the composition optical system 126, instead of the image forming unit 35 and the additional image forming unit 125. In this case, it is possible to simplify the structure of the pattern irradiation device 120 and to reduce costs.

The structure unique to the eighth embodiment may be applied to the embodiments other than the fourth embodiment.

Ninth Embodiment

Next, a three-dimensional measurement device 21 according to a ninth embodiment will be described. In a handling system 10 according to the ninth embodiment, devices other than the three-dimensional measurement device 21 may have any of the structures according to the first to eighth embodiments.

FIG. 21 is a diagram illustrating the structure of the three-dimensional measurement device 21 according to the ninth embodiment. The three-dimensional measurement device 21 includes a first imaging unit 151, a second imaging unit 152, a distance image generation unit 153, and a selective transmission unit 24.

The first imaging unit 151 captures an image of a target 11 placed on a tray 12. The first imaging unit 151 transmits a generated first image to the distance image generation unit 153.

The second imaging unit 152 captures an image of the target 11 placed on the tray 12 from a position different from the first imaging unit 151. The second imaging unit 152 transmits a generated second image to the distance image generation unit 153.

For example, the first imaging unit 151 and the second imaging unit 152 are provided such that the optical axes of lenses are parallel to each other and the optical axes are separated by a predetermined distance. Therefore, the first imaging unit 151 and the second imaging unit 152 can generate a stereo image.

The distance image generation unit 153 generates a distance image indicating the distance to each position of the exposed surface of each target 11 placed on the tray 12 on the basis of the first image and the second image. For example, the distance image generation unit 153 searches for pixels of the second image which correspond to each pixel of the first image and calculates the positional deviation between the pixels. Then, the distance image generation unit 153 outputs an image indicating the calculated positional deviation as the distance image indicating the distance to each position of the exposed surface of each target 11. The distance image generation unit 153 transmits the generated distance image to the recognition device 22.

The selective transmission unit 24 includes a first polarizing filter 161, a second polarizing filter 162, a first adjustment mechanism 165, and a second adjustment mechanism 166.

The first polarizing filter 161 is provided between the target 11 and an imaging element of the first imaging unit 151. The first polarizing filter 161 may be provided immediately before the lens of the first imaging unit 151, may be inserted into an optical path of the lens, or may be provided immediately before the imaging element. The first polarizing filter 161 may be provided separately from the first imaging unit 151 as long as it does not block light to be incident on the second imaging unit 152.

The first polarizing filter 161 blocks the first polarized light at a blocking ratio that is set by the first adjustment mechanism 165. That is, the first polarizing filter 161 transmits components (second polarized light) other than the first polarized light at a set transmittance.

For example, when the first polarized light is linearly polarized light with a first angle, the first polarizing filter 161 blocks the linearly polarized light with the first angle at a set blocking ratio and transmits linearly polarized light with a second angle perpendicular to the first angle at a set transmittance. When the first polarized light is circularly polarized light that rotates in a first direction, the first polarizing filter 161 blocks the circularly polarized light that rotates in the first direction at a set blocking ratio and transmits circularly polarized light that rotates in a second direction opposite to the first direction at a set transmittance.

The second polarizing filter 162 is provided between the target 11 and an imaging element of the second imaging unit 152. The second polarizing filter 162 may be provided immediately before the lens of the second imaging unit 152, may be inserted into an optical path of the lens, or may be provided immediately before the imaging element. The second polarizing filter 162 may be provided separately from the second imaging unit 152 as long as it does not block light to be incident on the first imaging unit 151.

The second polarizing filter 162 blocks the first polarized light at a blocking ratio that is set by the second adjustment mechanism 166. That is, the second polarizing filter 162 transmits components (second polarized light) other than the first polarized light at a set transmittance.

For example, when the first polarized light is the linearly polarized light with the first angle, the second polarizing filter 162 blocks the linearly polarized light with the first angle at a set blocking ratio and transmits the linearly polarized light with the second angle at a set transmittance. When the first polarized light is the circularly polarized light that rotates in the first direction, the second polarizing filter 162 blocks the circularly polarized light that rotates in the first direction at a set blocking ratio and transmits the circularly polarized light that rotates in the second direction at a set transmittance.

The first adjustment mechanism 165 adjusts the blocking ratio (the transmittance of the second polarized light) of the first polarized light by the first polarizing filter 161. The second adjustment mechanism 166 adjusts the blocking ratio (the transmittance of the second polarized light) of the first polarized light by the second polarizing filter 162.

Here, the blocking ratio of each of the first polarizing filter 161 and the second polarizing filter 162 can be adjusted. For example, each of the first polarizing filter 161 and the second polarizing filter 162 is provided so as to rotate about the optical axis. The first adjustment mechanism 165 changes the rotational position of the first polarizing filter 161 about the optical axis in response to an operation of the user. The second adjustment mechanism 166 changes the rotational position of the second polarizing filter 162 about the optical axis in response to an operation of the user.

When the user operates, for example, a lock button, the first adjustment mechanism 165 may fix the rotational position of the first polarizing filter 161. When the user operates, for example, a lock button, the second adjustment mechanism 166 may fix the rotational position of the second polarizing filter 162.

As such, the blocking ratios of the first polarized light by the first polarizing filter 161 and the second polarizing filter 162 are independently set during adjustment. For example, the rotational positions of the first polarizing filter 161 and the second polarizing filter 162 are independently changed by the first adjustment mechanism 165 and the second adjustment mechanism 166.

However, when the difference between the brightness of the first image captured by the first imaging unit 151 and the brightness of the second image captured by the second imaging unit 152 is large, the distance image generation unit 153 is not capable of searching for the corresponding points. Therefore, it is preferable that the first imaging unit 151 and the second imaging unit 152 generate the first image and the second image having a small brightness difference therebetween.

For example, when light that is directly reflected from the target 11 includes the first polarized light and light that is diffusely reflected from the target 11 is non-polarized light, the first polarizing filter 161 and the second polarizing filter 162 are set so as to block 100% of the first polarized light and transmit 100% of the second polarized light. In this case, when light that is directly reflected from the target 11 is greatly attenuated and is then incident on the first imaging unit 151 and the second imaging unit 152. Therefore, the first imaging unit 151 and the second imaging unit 152 can generate the first image and the second image having a small brightness difference therebetween.

In some cases, light that is directly reflected from the target 11 is not incident on the second imaging unit 152 according to the angle of the target 11. In this case, the blocking ratio of the first polarized light by the second polarizing filter 162 may be set to any value.

In some cases, light that is diffusely reflected from the target 11 includes a large amount of first polarized light according to, for example, the material forming the target 11. When the diffusely reflected light includes a large amount of first polarized light, the difference between components (components other than the first polarized light) of the second polarized light incident on the first imaging unit 151 and components of the second polarized light incident on the second imaging unit 152 is large. Therefore, in this case, when 100% of the first polarized light is blocked, the difference between the brightness of the first image captured by the first imaging unit 151 and the brightness of the second image captured by the second imaging unit 152 is likely to be large.

For this reason, the first polarizing filter 161 and the second polarizing filter 162 independently adjust the blocking ratio of the first polarized light according to, for example, the material forming the target 11 such that the difference between the brightness of the first image captured by the first imaging unit 151 and the brightness of the second image captured by the second imaging unit 152 is reduced. Therefore, substantially the same amount of light is incident on the first imaging unit 151 and the second imaging unit 152 and it is possible to reduce the difference in the brightness of the target 11 included in the images.

As such, the three-dimensional measurement device 21 according to this embodiment includes the first polarizing filter 161 and the second polarizing filter 162. The first polarizing filter 161 and the second polarizing filter 162 can independently adjust the blocking ratio of the first polarized light incident on the first imaging unit 151 and the blocking ratio of the first polarized light incident on the second imaging unit 152. Therefore, in the three-dimensional measurement device 21, the first imaging unit 151 and the second imaging unit 152 can capture the images of the target 11 having a small brightness difference therebetween, regardless of, for example, the light reflection angle of the target 11 and the material forming the target 11. According to the three-dimensional measurement device 21 of this embodiment, it is possible to generate a distance image with high accuracy.

Tenth Embodiment

Next, a three-dimensional measurement device 21 according to a tenth embodiment will be described. The three-dimensional measurement device 21 according to the tenth embodiment has substantially the same function and structure as the three-dimensional measurement device 21 according to the ninth embodiment. Members having substantially the same function and structure as in the ninth embodiment are denoted by the same numerals and the detailed description thereof will not be repeated. Only the difference between the tenth embodiment and the ninth embodiment will be described.

FIG. 22 is a diagram illustrating the structure of the three-dimensional measurement device 21 according to the tenth embodiment. The three-dimensional measurement device 21 according to this embodiment further includes a driving unit 171 and an adjustment unit 172.

The driving unit 171 changes the blocking ratio of the first polarized light by the first polarizing filter 161 and the blocking ratio of the first polarized light by the second polarizing filter 162, according to a given set value. The driving unit 171 is, for example, a motor. The driving unit 171 gives driving force to the first adjustment mechanism 165 to change the rotational position of the first polarizing filter 161. In addition, the driving unit 171 gives driving force to the second adjustment mechanism 166 to change the rotational position of the second polarizing filter 162.

The adjustment unit 172 acquires a first image that is captured by the first imaging unit 151 during adjustment and a second image that is captured by the second imaging unit 152 during adjustment. The adjustment unit 172 calculates the brightness of the first image and the brightness of the second image. Then, the adjustment unit 172 gives the driving unit 171 a set value at which the difference between the brightness of the first image and the brightness of the second image is reduced to adjust the blocking ratio of the first polarized light by the first polarizing filter 161 and the blocking ratio of the first polarized light by the second polarizing filter 162.

For example, when the brightness of the first image is more than the brightness of the second image, the adjustment unit 172 increases the blocking ratio of the first polarized light by the first polarizing filter 161 and decreases the blocking ratio of the first polarized light by the second polarizing filter 162. When the brightness of the second image is more than the brightness of the first image, the adjustment unit 172 increases the blocking ratio of the first polarized light by the second polarizing filter 162 and decreases the blocking ratio of the first polarized light by the first polarizing filter 161. Then, the adjustment unit 172 repeats this process to detect the blocking ratios of the first polarized light by the first polarizing filter 161 and the second polarizing filter 162 at which the brightness of the first image is substantially equal to the brightness of the second image. For example, the adjustment unit 172 may change a combination of the blocking ratios of the first polarized light by the first polarizing filter 161 and the second polarizing filter 162 to search for the blocking ratio at which the brightness difference is small.

As such, the three-dimensional measurement device 21 according to this embodiment can automatically detect the blocking ratios of the first polarized light by the first polarizing filter 161 and the second polarizing filter 162 at which the difference between the brightness of the first image and the brightness of the second image is small. Therefore, the three-dimensional measurement device 21 according to this embodiment can reduce the burden of an adjustment process on the user.

Eleventh Embodiment

Next, a three-dimensional measurement device 21 according to an eleventh embodiment will be described. The three-dimensional measurement device 21 according to the eleventh embodiment has substantially the same function and structure as the three-dimensional measurement device 21 according to the tenth embodiment. Members having substantially the same function and structure as in the tenth embodiment are denoted by the same numerals and the detailed description thereof will not be repeated. Only the difference between the eleventh embodiment and the tenth embodiment will be described.

FIG. 23 is a diagram illustrating the structure of the three-dimensional measurement device 21 according to the eleventh embodiment. The three-dimensional measurement device 21 according to this embodiment includes an imaging control unit 181, instead of the adjustment unit 172. The three-dimensional measurement device 21 according to this embodiment further includes a storage unit 182 and a composition unit 183.

The imaging control unit 181 changes a set value given to the driving unit 171 to change a combination of the blocking ratio of the first polarized light by the first polarizing filter 161 and the blocking ratio of the first polarized light by the second polarizing filter 162. Then, the imaging control unit 181 directs the first imaging unit 151 and the second imaging unit 152 to perform an imaging process in each state in which the combination of the blocking ratios of the first polarized light is changed.

For example, in a first imaging process, the imaging control unit 181 sets the blocking ratio of the first polarized light by the first polarizing filter 161 to 60%, sets the blocking ratio of the first polarized light by the second polarizing filter 162 to 80%, and performs the imaging process. Then, in a second imaging process, the imaging control unit 181 sets the blocking ratio of the first polarized light by the first polarizing filter 161 to 20%, sets the blocking ratio of the first polarized light by the second polarizing filter 162 to 50%, and performs the imaging process. As such, the imaging control unit 181 performs a plurality of imaging processes while changing the combination of the blocking ratios of the first polarized light. The plurality of imaging processes may include a process in which the imaging control unit 181 sets the blocking ratio of the first polarized light by the first polarizing filter 161 and the blocking ratio of the first polarized light by the second polarizing filter 162 to the same value.

The distance image generation unit 153 generates a distance image indicating the distance to the target 11 on the basis of the first image captured by the first imaging unit 151 and the second image captured by the second imaging unit 152 in each of the plurality of imaging processes. The storage unit 182 stores a plurality of distance images generated by the distance image generation unit 153.

The composition unit 183 combines the plurality of distance images stored in the storage unit 182. For example, the composition unit 183 extracts distance data of a pixel position where an effective distance is calculated from each of the plurality of distance images and combines the distance data. When effective distance data is extracted from a plurality of distance images at the same pixel position, the composition unit 183 may select any one of the distance data items or may average the plurality of extracted image data items. Then, the composition unit 183 transmits the combined distance image to the recognition device 22.

In some cases, a plurality of targets 11 are randomly placed on the tray 12. In this case, there is a situation in which light that is directly reflected from a certain target 11 is incident on the first imaging unit 151 and light that is directly reflected from another target 11 is incident on the second imaging unit 152. The three-dimensional measurement device 21 captures the images of the plurality of targets 11 placed on the tray 12 a plurality of times while changing the combination of the blocking ratios of the first polarized light by the first polarizing filter 161 and the second polarizing filter 162 and generates a plurality of distance images. In this way, the three-dimensional measurement device 21 can block light that is directly reflected from a certain target 11, using the first polarizing filter 161, and capture the image of the target 11 in a certain imaging process. Then, in another imaging process, the three-dimensional measurement device 21 can block light that is directly reflected from another target 11, using the second polarizing filter 162, and capture the image of the target 11.

Therefore, even for a target 11 to which the distance is not capable of being measured due to a large difference between the brightness of the first image and the brightness of the second image in a certain imaging process, the three-dimensional measurement device 21 can measure the distance to the target 11 in another imaging process. The three-dimensional measurement device 21 extracts portions in which the distance can be effectively measured from the acquired plurality of distance images and combines the distance images. In this way, the three-dimensional measurement device 21 can generate a high-accuracy distance image with a small portion in which the distance is not capable of being measured due to a brightness difference.

In the above-mentioned example, the three-dimensional measurement device 21 combines a plurality of distance images. Instead of the structure, the three-dimensional measurement device 21 may generate a first composite image obtained by combining a plurality of first images and a second composite image obtained by combining a plurality of second images. For example, the three-dimensional measurement device 21 combines a plurality of first images except for a pixel region with clipped whites or crushed blacks. When there are a plurality of pixels without clipped whites or crushed blacks, the three-dimensional measurement device 21 may select any one of the pixels or may average the pixels. Similarly, the three-dimensional measurement device 21 generates a second composite image.

Then, the three-dimensional measurement device 21 generates a distance image on the basis of the first composite image and the second composite image. In this way, the three-dimensional measurement device 21 can generate a high-accuracy distance image with a small portion in which the distance is not capable of being measured due to a brightness difference.

In addition, the three-dimensional measurement device 21 may switch the direction of the first polarized light in the pattern irradiation device 20, instead of or in addition to changing the combination of the blocking ratio of the first polarized light by the first polarizing filter 161 and the blocking ratio of the first polarized light by the second polarizing filter 162. For example, when the first polarized light is linearly polarized light, the three-dimensional measurement device 21 may switch the angle of the first polarized light. When the first polarized light is circularly polarized light, the three-dimensional measurement device 21 may switch the rotation direction of the first polarized light. In this case, the three-dimensional measurement device 21 can switch the pattern and amount of directly reflected light that is incident on the first imaging unit 151 and the second imaging unit 152.

The embodiments of the invention have been described above. However, the embodiments are illustrative and are not intended to limit the scope of the invention. Various modifications of the novel embodiments can be made.

REFERENCE SIGNS LIST

10 Handling system
11 Target
12 Tray
13 Robot
20, 50, 60, 70, 80, 90, 110, 120 Pattern irradiation device
21 Three-dimensional measurement device
22 Recognition device
23 Robot controller
24 Selective transmission unit
30 Projection surface
31 Light emitting unit
32 Condensing unit
33 Transmission/diffusion plate
34 Light tunnel
35 Image forming unit
36 Irradiation optical system
41 Laser diode
42 Collimator lens
43 Reflecting side surface
44 Optical path
45 Inlet
46 Outlet
51 Reflecting/diffusion plate
52 Transmission/diffusion surface
53 Reflecting surface
61 Tapered light tunnel
62 Reflecting side surface
63 Optical path
64 Inlet
65 Outlet
71 Prism
72 First minor group
73 Lens
74 Mirror
75 Single-plate mirror
81 Second mirror group
82 Cylindrical lens
83 Mirror
91 Third minor group
93 Minor
111 Polarizing filter
112 Attachment/detachment mechanism
121 Additional light emitting unit
122 Additional condensing unit
123 Additional reflecting/diffusion plate
124 Additional tapered light tunnel
125 Additional image forming unit
126 Composition optical system
130 Control unit
151 First imaging unit
152 Second imaging unit
153 Distance image generation unit
161 First polarizing filter
162 Second polarizing filter
165 First adjustment mechanism
166 Second adjustment mechanism
171 Driving unit
172 Adjustment unit
181 Imaging control unit
182 Storage unit
183 Composition unit

CITATION LIST

Patent Literature

PTL 1: Japanese Laid-open Patent Publication No. 2013-222056
PTL 2: Japanese Laid-open Patent Publication No. 2013-257162

The invention claimed is:

1. A system comprising:
an illumination device; and
an imaging device configured to capture an image of a target which is irradiated with light by the illumination device;
the illumination device comprising:
a light emitting unit configured to emit first polarized light;
a condensing unit configured to focus light emitted from the light emitting unit;
a transmission/diffusion unit configured to transmit and diffuse the light focused by the condensing unit; and
a uniformization optical system configured to receive the light diffused by the transmission/diffusion unit, uniformize an illuminance distribution of the light compared with an illuminance distribution of the light before the uniformization optical system receives the light, and emit the light;
the system further comprising a selective transmission unit provided on an optical path from the target to an imaging element of the imaging device and configured to block the first polarized light at a predetermined blocking ratio.

2. The system according to claim 1, wherein a full width at half maximum of a diffusion angle of the transmission/diffusion unit is equal to or less than 10°.

3. The system according to claim 1, wherein the selective transmission unit comprises a polarizing filter configured to block the first polarized light and transmit polarized light other than the first polarized light.

4. The system according to claim 1, wherein the light emitting unit comprises a plurality of light sources configured to emit the first polarized light in a same direction.

5. The system according to claim 4, wherein
the light emitting unit further comprises a plurality of collimator lenses provided to correspond to the plurality of light sources, and
the collimator lenses are configured to change light emitted from the corresponding light sources to parallel beams.

6. The system according to claim 5, wherein
the condensing unit comprises:
a mirror group configured to reflect a plurality of beams emitted from the light emitting unit; and
a lens configured to focus the plurality of beams reflected by the mirror group, and
the mirror group reflects the plurality of beams emitted from the light emitting unit to the condensing unit such that a beam width formed by the plurality of beams emitted from the light emitting unit in the same direction is reduced.

7. The system according to claim 1, wherein the condensing unit comprises a lens configured to focus the light emitted from the light emitting unit on the transmission/diffusion unit.

8. The system according to claim 1, wherein the transmission/diffusion unit comprises a transmission/diffusion plate.

9. The system according to claim 1, wherein
the uniformization optical system comprises a light tunnel having an optical path in which a reflecting side surface reflecting light inward is formed, and
the light diffused by the transmission/diffusion unit is incident on the light tunnel through an inlet of the optical path, passes through the optical path, and is emitted from an outlet of the optical path.

10. The system according to claim 9, wherein, in the light tunnel, the outlet is larger than the inlet and the reflecting side surface is inclined with respect to an optical axis of the optical path.

11. The system according to claim 1, further comprising:
an additional light emitting unit configured to emit second polarized light different from the first polarized light;
an additional condensing unit configured to focus light emitted from the additional light emitting unit;
an additional transmission/diffusion unit configured to transmit and diffuse the light focused by the additional condensing unit;
an additional uniformization optical system configured to receive the light diffused by the additional transmission/diffusion unit, uniformize an illuminance distribution of the light compared with an illuminance distribution of the light before the additional uniformization optical system receives the light, and emit the light; and
a composition optical system configured to combine the first polarized light emitted from the uniformization optical system with the second polarized light emitted from the additional uniformization optical system.

12. The system according to claim 1, wherein the imaging device comprises a three-dimensional measurement device configured to measure a distance to the target irradiated with light by the illumination device.

13. A system comprising:
a pattern irradiation device configured to irradiate a target with a predetermined pattern image; and
an imaging device configured to capture an image of the target irradiated with light by the pattern irradiation device;
the pattern irradiation device comprising:
a light emitting unit configured to emit first polarized light;
a condensing unit configured to focus the light emitted from the light emitting unit;
a transmission/diffusion unit configured to transmit and diffuse the light focused by the condensing unit;
a uniformization optical system configured to receive the light diffused by the transmit/diffusion unit, uniformize an illuminance distribution of the light compared with an illuminance distribution of the light before the uniformization optical system receives the light, and emit the light;
an image forming unit configured to transmit the light emitted from the uniformization optical system according to a predetermined image pattern; and
an irradiation optical system configured to irradiate the target with the light transmitted through the image forming unit;
the system further comprising a selective transmission unit provided on an optical path from the target to an imaging element of the imaging device, and configured to block first polarized light, and transmit polarized light other than the first polarized light.

14. The system according to claim 13, wherein the image forming unit is a photomask.

15. The system according to claim 13, wherein the imaging device comprises a three-dimensional measurement device configured to measure a distance to the target irradiated with light by the pattern irradiation device.

16. The system according to claim 15, wherein
the imaging device comprises:
- a first imaging unit configured to capture an image of the target; and
- a second imaging unit configured to capture an image of the target from a position different from the first imaging unit; and the selective transmission unit comprises:
- a first polarizing filter provided between the target and an imaging element of the first imaging unit and configured to block the first polarized light at a predetermined blocking ratio; and
- a second polarizing filter provided between the target and an imaging element of the second imaging unit and configured to block the first polarized light at a predetermined blocking ratio.

17. The system according to claim 16, wherein the blocking ratios of the first polarizing filter and the second polarizing filter can be adjusted.

18. The system according to claim 17, wherein the selective transmission unit further comprises a driving unit configured to change the blocking ratio of the first polarized light by the first polarizing filter and the blocking ratio of the first polarized light by the second polarizing filter, according to a given set value.

19. The system according to claim 18, further comprising an adjustment unit configured to give the set value at which a difference between brightness of a first image of the target captured by the first imaging unit and brightness of a second image of the target captured by the second imaging unit is reduced, to the driving unit to adjust the blocking ratio of the first polarized light by the first polarizing filter and the blocking ratio of the first polarized light by the second polarizing filter.

20. The system according to claim 15, further comprising:
- a robot configured to handle the target;
- a recognition device configured to recognize a position and an orientation of the target, based on the distance to the target measured by the imaging device; and
- a robot controller configured to control an operation of the robot based on a position and orientation of the target recognized by the recognition device, and cause the robot to handle the target.

* * * * *